United States Patent
Hirschmann

(10) Patent No.: US 6,649,229 B2
(45) Date of Patent: *Nov. 18, 2003

(54) STN LIQUID CRYSTAL DISPLAY

(75) Inventor: Harald Hirschmann, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/326,393

(22) Filed: Dec. 23, 2002

(65) Prior Publication Data

US 2003/0148043 A1 Aug. 7, 2003

Related U.S. Application Data

(62) Division of application No. 09/734,197, filed on Dec. 12, 2000, now Pat. No. 6,531,194.

(30) Foreign Application Priority Data

Dec. 14, 1999 (DE) .......................... 199 60 187

(51) Int. Cl.[7] .................. C09K 19/30; C09K 19/20; C09K 19/12; G02F 1/1333
(52) U.S. Cl. .............. 428/1.1; 252/299.63; 252/299.67; 252/299.66; 349/186
(58) Field of Search ............. 428/1.1; 252/299.63, 252/299.66, 299.67; 349/186

(56) References Cited

U.S. PATENT DOCUMENTS

| | | |
|---|---|---|
| 5,308,538 A | 5/1994 | Weber et al. |
| 5,744,058 A | 4/1998 | Reiffenrath et al. |
| 5,776,366 A | 7/1998 | Tomi et al. |
| 6,174,457 B1 | 1/2001 | Kato et al. |
| 6,207,075 B1 | 3/2001 | Muaoka et al. |
| 6,531,194 B2 * | 3/2003 | Hirschmann ................ 428/1.1 |

* cited by examiner

*Primary Examiner*—Shean C. Wu
(74) *Attorney, Agent, or Firm*—Millen, White, Zelano, Branigan, P.

(57) ABSTRACT

The invention relates to supertwist liquid-crystal displays (SLCDs) having very short response times and good steepnesses and angular dependences and to the novel nematic liquid-crystal mixtures employed therein, which are distinguished by the fact that they comprise at least one compound of the formula, IA

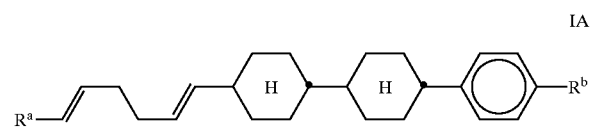

and at least one compound of the formula IB

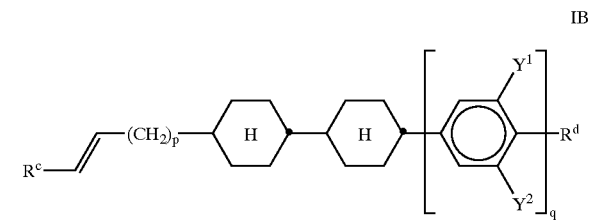

and/or at least one compound of the formula IC

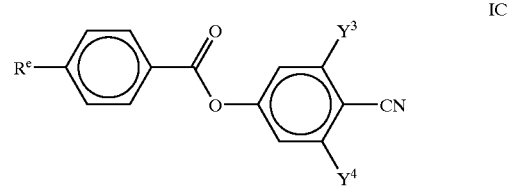

in which $R^a$, $R^b$, $R^c$, $R^d$, $R^e$, $Y^1$, $Y^2$, $Y^3$, $Y^4$, q and p are as defined herein.

14 Claims, No Drawings

STN LIQUID CRYSTAL DISPLAY

This application is a divisional of U.S. patent application Ser. No. 09/734,197, filed Dec. 12, 2000 (allowed), now U.S. Pat. No 6,531,194.

The invention relates to supertwist liquid-crystal displays (SLCDS) or supertwisted nematic (STN) displays having very short response times and good steepnesses and angle dependencies, and to the novel nematic liquid-crystal mixtures used therein.

SLCDs as defined in the preamble are known, for example from EP 0 131 216 B1; DE 34 23 993 A1; EP 0 098 070 A2; M. Schadt and F. Leenhouts, 17th Freiburg Congress on Liquid Crystals (8.–10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784–L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987), and E. P. Raynes, Mol. Cryst. Liq. Cryst. Letters Vol. 4 (1), pp. 1–8 (1986). The term SLCD here covers any relatively highly twisted display element with a value for the twist angle of between 160° and 360°, such as, for example, the display elements of Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

SLCDs of this type are distinguished, in comparison to standard TN displays, by significantly better steepnesses of the electro-optical characteristic line and consequently better contrast values, and by significantly lower angle dependence of the contrast.

Of particular interest are SLCDs having very short response times, in particular at relatively low temperatures. In order to achieve short response times, the rotational viscosities of the liquid-crystal mixtures have hitherto been optimized using usually monotropic additives having relatively high vapour pressure. However, the response times achieved were not adequate for all applications.

In order to achieve a steep electro-optical characteristic line in SLCDs, the liquid-crystal mixtures should have relatively large values for $K_3/K_1$ and relatively small values for $\Delta\epsilon/\epsilon_\perp$.

In addition to optimization of the contrast and the response times, mixtures of this type are subject to further important requirements:

1. A broad d/p window
2. High long-term chemical stability
3. High electrical resistance
4. Low frequency and temperature dependence of the threshold voltage.

The parameter combinations achieved are still far from adequate, in particular for high-multiplex, but also for low- and medium-multiplex STNs (1/400). This is in some cases attributable to the fact that the various requirements are affected in opposite manners by material parameters.

There thus continues to be a great demand for SLCDs, in particular for high-resolution displays (XGAs), having very short response times and at the same time a large operating temperature range, high characteristic line steepness, good angle dependence of the contrast and low threshold voltage which meet the abovementioned requirements.

It is an object of the invention to provide SLCDs which do not have the abovementioned disadvantages, or only do so to a lesser extent, and at the same time have short response times, in particular at low temperatures, and very good steepnesses.

Upon further study of the specification and appended claims, further objects and advantages of this invention will become apparent to those skilled in the art.

It has now been found that these objects can be achieved if nematic liquid-crystal mixtures are used which comprise compounds of the formula IA

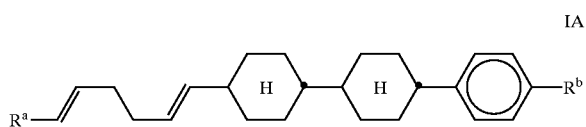

IA in combination with compounds of the formula IB

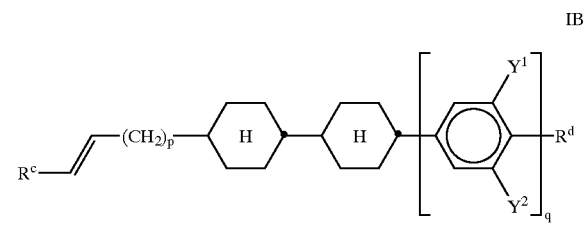

IB and/or with compounds of the formula IC

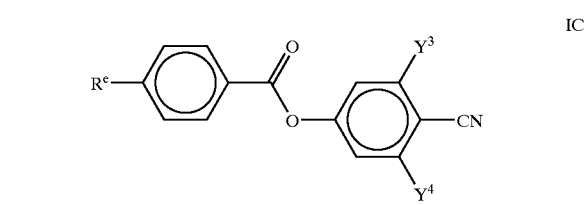

IC in which $R^a$ and $R^c$ are each, independently of one another, H or an alkyl group having 1 to 7 carbon atoms, and $R^b$ and $R^e$ are each, independently of one another, an alkyl or alkoxy group having 1 to 10 carbon atoms or an alkenyl or alkenyloxy group having 2 to 10 carbon atoms, $R^d$ is F, $OCF_3$, $OCHF_2$, alkyl or alkoxy having 1 to 7 carbon atoms or alkenyl having 2 to 7 carbon atoms, $Y^1, Y^2, Y^3, Y^4$ are each, independently of one another, H or F, q is 0 or 1 and p is 0, 1 or 2.

The use of the compounds of the formulae IA and IB in the mixtures for SLCDs according to the invention produces high steepness of the electro-optical characteristic line low temperature dependence of the threshold voltage and very short response times, in particular at low temperatures.

The compounds of the formula IA are covered by the broad generic claim in U.S. Pat. No. 5,744,058 as components of liquid-crystalline media. However, the specific combination of the compounds of the formula IA with the compounds IB and/or the compounds IC which produces, in particular, high steepness of the electro-optical characteristic line and low temperature dependence of the threshold voltage in connection with low rotation viscosities, is not described therein.

The combination of compounds of the formulae IA and IB and/or IC results, in particular, in a significant shortening of the response times of SLCD mixtures while simultaneously increasing the steepness and obtaining a low temperature dependence of the threshold voltage.

Furthermore, the mixtures according to the invention are distinguished by the following advantages:
  they have a low viscosity,
  they have low temperature dependence of the threshold voltage and the operating voltage, and
  they result in long storage times in the display at low temperatures.

The invention therefore relates to a liquid-crystal display containing
  two outer plates which, together with a frame, form a cell,
  a nematic liquid-crystal mixture of positive dielectric anisotropy which is present in the cell,
  electrode layers with alignment layers on the insides of the outer plates,
  a pretilt angle between the longitudinal axis of the molecules at the surface of the outer plates and the outer plates of from 0 to 30 degrees, and
  a twist angle of the liquid-crystal mixture in the cell from alignment layer to alignment layer with a value of 22.5° to 600°, and
  a nematic liquid-crystal mixture comprising of
    a) 0–60% by weight of a liquid-crystalline component A consisting of one or more compounds having a dielectric anisotropy of greater than +1.5;
    b) 0–60% by weight of a liquid-crystalline component B consisting of one or more compounds having a dielectric anisotropy of between −1.5 and +1.5;
    c) 0–20% by weight of a liquid-crystalline component D consisting of one or more compounds having a dielectric anisotropy of below −1.5; and
    d) optionally an optically active component C in such an amount that the ratio between the layer thickness (separation of the outer plates) and the natural pitch of the chiral nematic liquid-crystal mixture is from about 0.2 to 1.3,
characterized in that the liquid-crystal mixture additionally comprises at least one compound of the formula IA

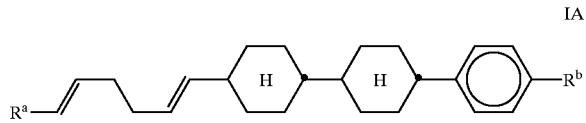

IA in which
  $R^a$ is H or an alkyl group having 1 to 7 carbon atoms, and
  $R^b$ is an alkyl or alkoxy group having 1 to 10 carbon atoms or an alkenyl or alkenyloxy group having 2 to 10 carbon atoms,
  and at the same time at least one compound of the formula IB

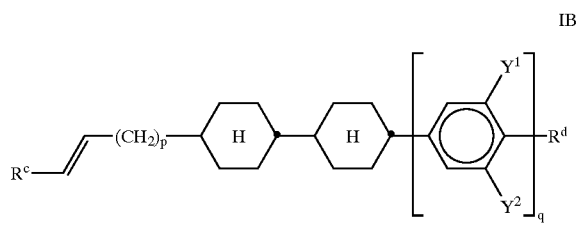

IB in which
  $R^c$ is H or an alkyl group having 1 to 7 carbon atoms, and
  $R^d$ is F, $OCF_3$, $OCHF_2$, an alkyl or alkoxy group having 1 to 7 carbon atoms or an alkenyl group having 2 to 7 carbon atoms,
  $Y^1$ and $Y^2$ are each, independently of one another, H or F,
  p is 0, 1 or 2, and
  q is 0 or 1
  and, in addition to the compounds of the formula IB or instead of the compounds of the formula IB, at least one compound of the formula IC

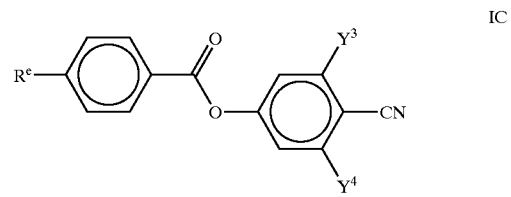

IC in which
  $R^e$ is an alkyl or alkoxy group having 1 to 10 carbon atoms or an alkenyl or alkenyloxy group having 2 to 10 carbon atoms, and
  $Y^3$ and $Y^4$ are each, independently of one another, H or F.

The invention also relates to corresponding liquid-crystal mixtures for use in SLCDs, in particular in medium- and low-multiplexed SLCDs.

The compounds of the formulae. IA, IB and IC and all further compounds mentioned herein are prepared by methods known per se, as described in the literature (e.g. in the standard works such as Houben-Weyl, Methoden der Organischen Chemie, Georg-Thieme-Verlag, Stuttgart, or in EP 00 19 665), to be precise under reaction conditions which are known and suitable for said reactions.

Use can be made here of variants which are known per se, but are not mentioned here in greater detail.

The formula IB comprises the following preferred compounds

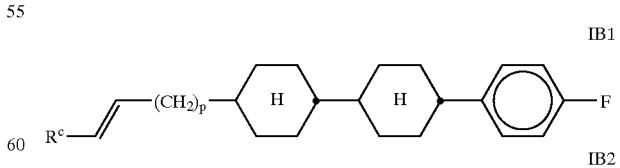

IB1

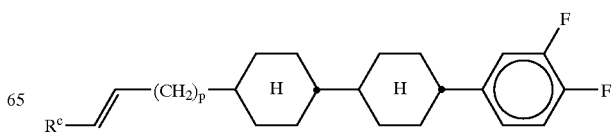

IB2

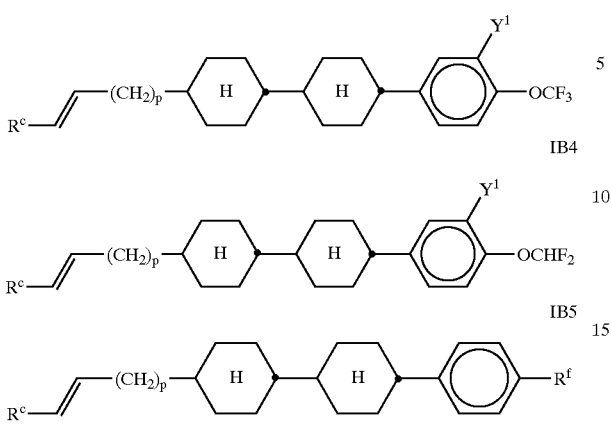

in which $R^c$, $Y^1$ and p are as defined above, and $R^f$ is an alkyl or alkoxy group having 1 to 7 carbon atoms. $R^f$ is particularly preferably methyl, ethyl, n-propyl, n-pentyl, methoxy, ethoxy, n-propyloxy or n-butyloxy.

Further preferred compounds of the formula IB are those of the subformulae IB6 and IB7

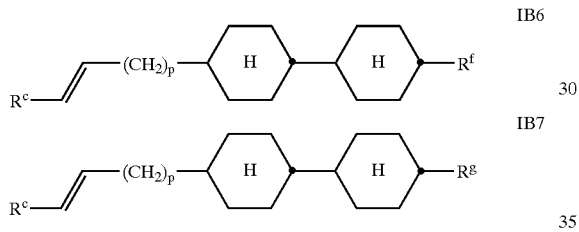

in which $R^c$ and $R^f$ are as defined above, and $R^g$ is alkenyl having 2 to 7 carbon atoms, in particular vinyl, 1E-propenyl, 1E-butenyl, 3E-butenyl, 1E-pentenyl or 3E-pentenyl.

Preference is given to mixtures which, in addition to the compounds of the formula IA, comprise the compounds IB2, IB5, IB6 and/or IB7.

Preferred compounds of the formula IB are those in which p is independently 0 or 2.

$R^a$ and $R^c$ are preferably, independently of one another, H, a methyl group, an ethyl group or an n-propyl group, in particular H or a methyl group.

$R^b$ is preferably a straight-chain alkoxy group having 1 to 7 carbon atoms. In particular, $R^b$ is a methoxy, ethoxy or n-propoxy group. $R^b$ is very particularly preferably a methoxy group.

$R^e$ is preferably a stright-chain alkyl group having 1 to 7 carbon atoms.

Preference is given to compounds of the formula IC in which $Y^3$ is F and $Y^4$ is simultaneously H. Preference is furthermore given to compounds of the formula IC in which $Y^3$ and $Y^4$ are simultaneously F.

$R^d$ is preferably F, $OCF_3$, $OCHF_2$, a methyl, ethyl or n-propyl group or a methoxy, ethoxy or n-propyloxy group. $R^d$ is particularly preferably F, $OCF_3$ or $OCHF_2$.

Preference is given to compounds of the formula IB in which $Y^1$ is F and $Y^2$ is simultaneously H.

Preference is furthermore given to compounds of the formula IB in which $Y^1$ and $Y^2$ are simultaneously H.

Of the compounds of the formulae IA, IB and IC and the subformulae, preference is given to those in which at least one of the radicals present therein has one of the meanings indicated.

The compounds of the formulae IB1, IB2 and IB7 are particularly preferred.

Component A preferably comprises compounds of the formulae II and/or III

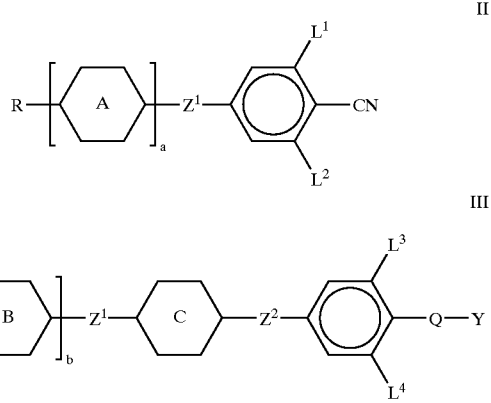

in which

R is an alkyl, alkoxy or alkenyl group having 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another,

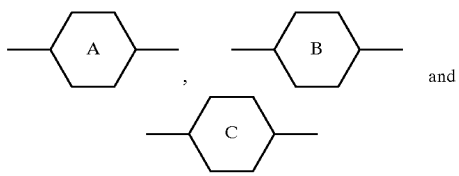

are each, independently of one another,

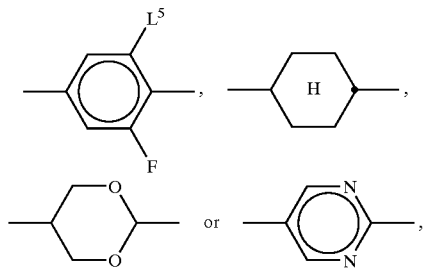

$L^1$ to $L^5$ are each, independently of one another, H or F, $Z^1$ is —COO—, —$CH_2CH_2$— or a single bond, $Z^2$ is —$CH_2CH_2$—, —COO—, —C≡C— or a single bond, Q is —$CF_2$—, —CHF—, —$OCF_2$—, —OCHF— or a single bond, Y is F or Cl a is 1 or 2, and b is 0 or 1, with the proviso that compounds of the formula IB are excluded from the scope of formula III.

Preferred compounds of the formula II correspond to the subformulae IIa to IIh:

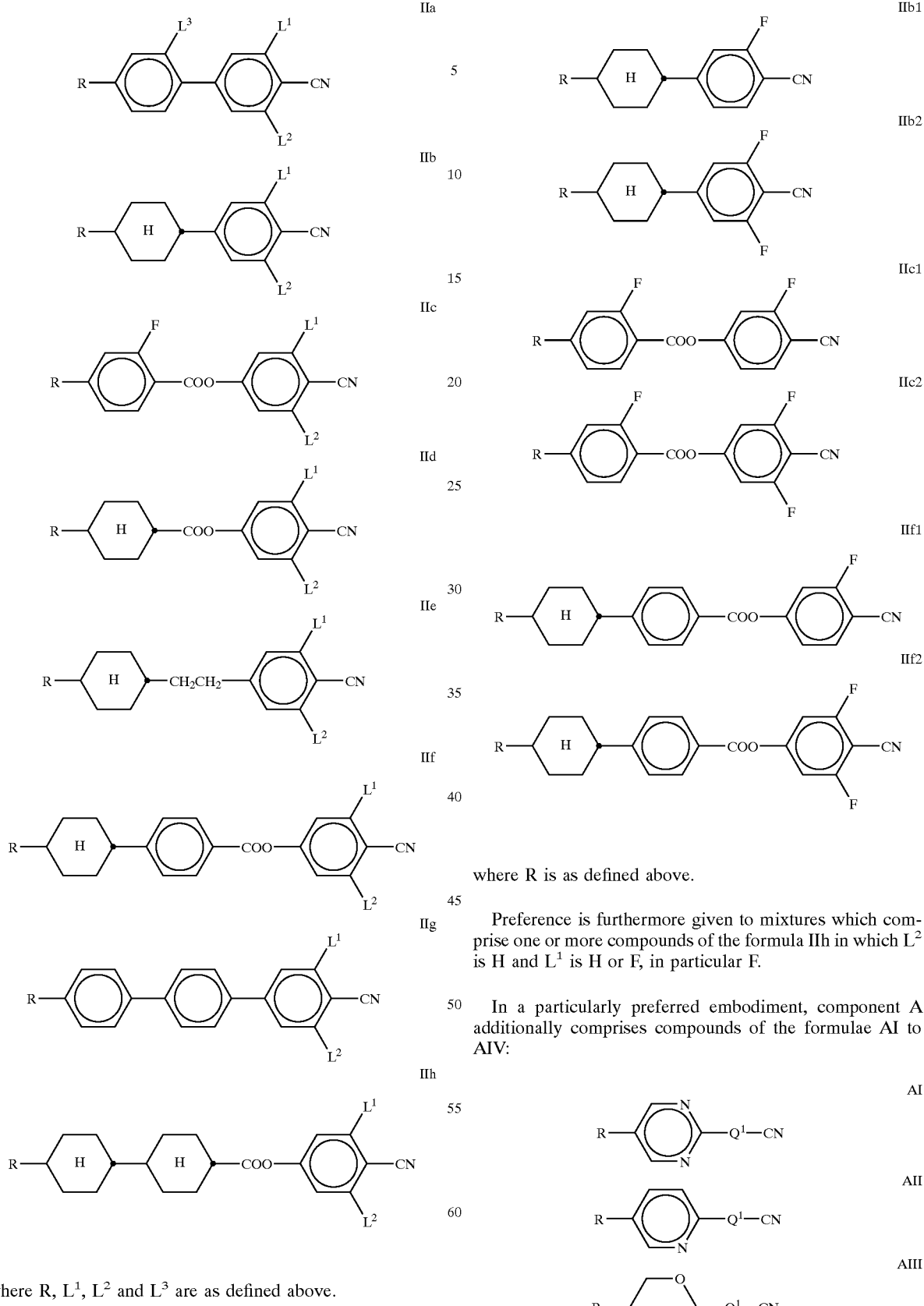

where R, L¹, L² and L³ are as defined above.

Particular preference is given to mixtures which comprise one or more compounds of the following subformulae where R is as defined above.

Preference is furthermore given to mixtures which comprise one or more compounds of the formula IIh in which L² is H and L¹ is H or F, in particular F.

In a particularly preferred embodiment, component A additionally comprises compounds of the formulae AI to AIV:

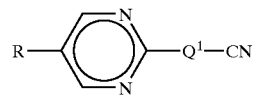

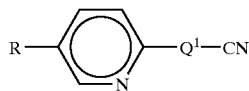

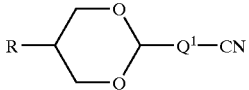

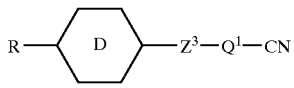

in which

R is an alkyl, alkoxy or alkenyl group having 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another,

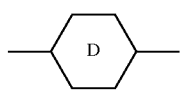

and $Q^1$ are each, independently of one another,

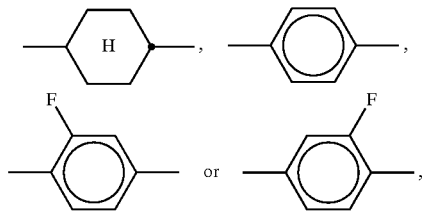

$Z^3$ is

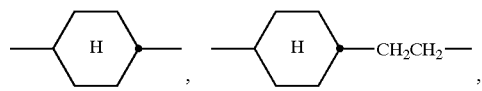

—$CH_2CH_2$—, —O—CO, or a single bond.

The mixtures according to the invention preferably comprise one or more polar compounds having a high clearing point selected from the group consisting of the compounds AIV1 to AIV4:

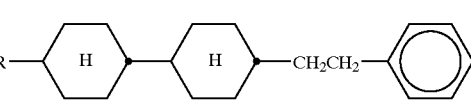

In the compounds AIV1 to AIV4, the 1,4-phenylene rings can also be laterally substituted by one or two fluorine atoms. Preferred compounds of this type are the compounds of the formulae AIV1-1, AIV1-2 and AIV1-3:

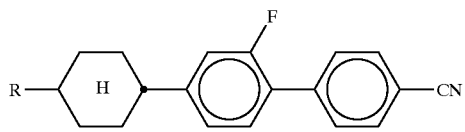

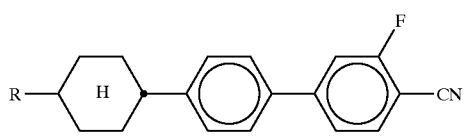

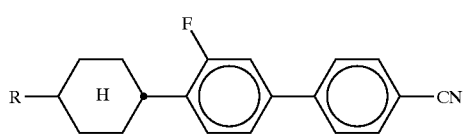

In the mixtures according to the invention which comprise compounds of the formulae AIV1 to AIV4, the proportion of these compounds is preferably from about 2 to 25%.

Preferred compounds of the formula III correspond to the subformulae IIIa–IIIv:

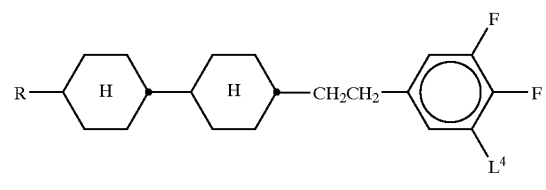
IIIh

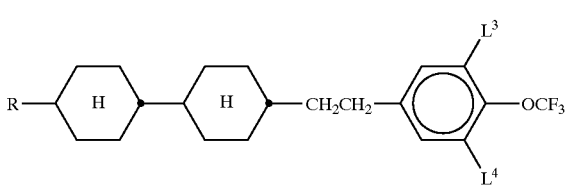
IIIi

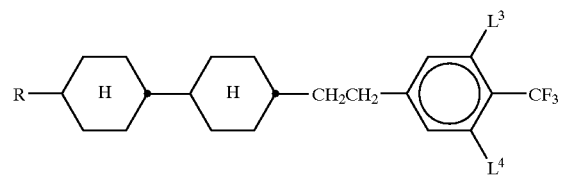
IIIj

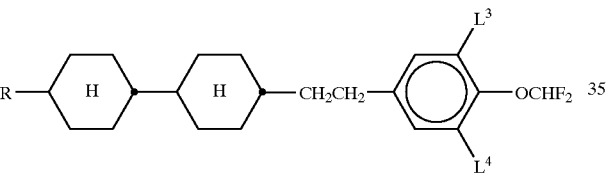
IIIk

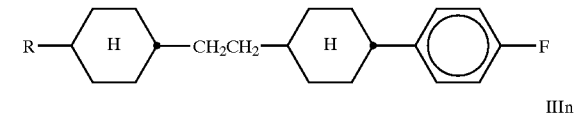
IIIm

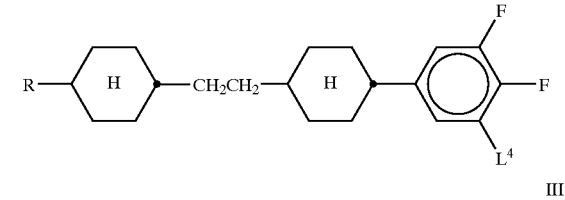
IIIn

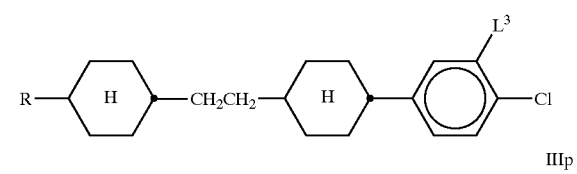
IIIo

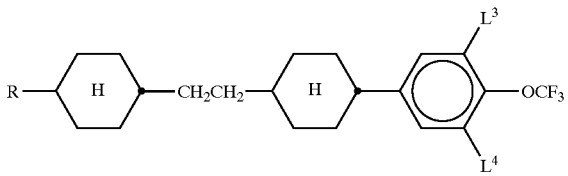
IIIp

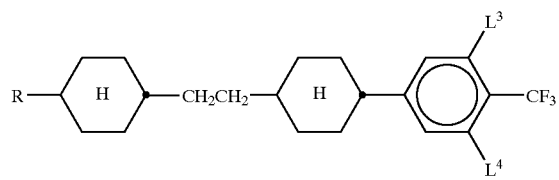
IIIq

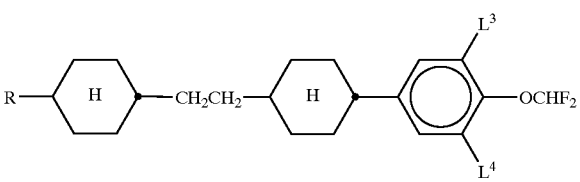
IIIr

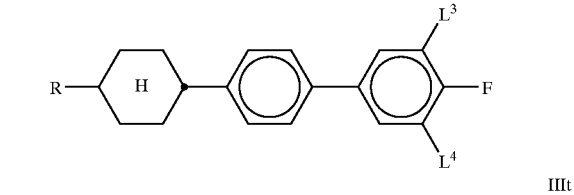
IIIs

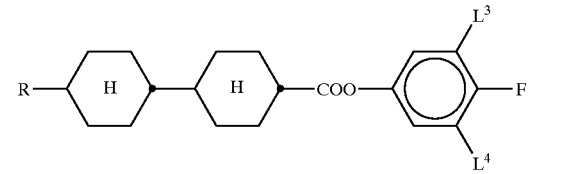
IIIt

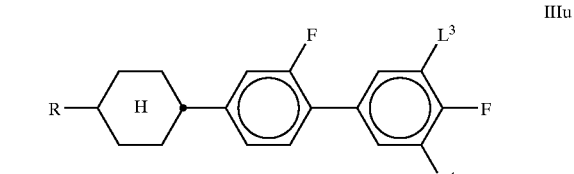
IIIu

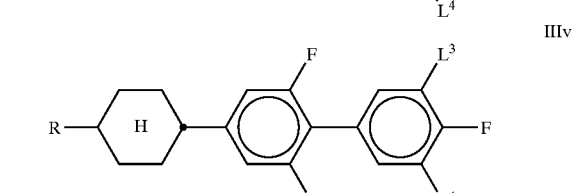
IIIv in which R is as defined above, $L^3$ and $L^4$ are each, independently of one another, H or F, and $R^3$ is alkyl or alkoxy having 1 to 7 carbon atoms.

Of the compounds of the formulae IIIa to IIIv, particular preference is given to those in which $L^4$ is F, furthermore those in which $L^3$ and $L^4$ are each F.

In addition to one or more compounds of the formulae IA, IB and IC, preferred mixtures comprise one, two, three or more compounds of the formulae IIa, IIb, IIc, IIf, IIIb, IIId, IIIf, IIIh, IIIi, IIIm, IIIs, IIIt or IIIu, preferably one or more compounds of the formula IIIb, IIId, IIIh, IIIt or IIIu, and from one to four compounds of the formulae IA, IB and IC and from one to three compounds of the formulae IIa, IIb and/or IIc.

In the preferred compounds mentioned hereinabove and hereinafter R, $R^1$ and $R^2$, unless stated otherwise, are preferably straight-chain alkyl, alkenyl or alkoxy, in particular alkyl, having 1 to 12 carbon atoms, in particular having 1 to 7 carbon atoms.

Preference is given to mixtures comprising the compounds IA, IB and IC.

Preference is furthermore given to mixtures which comprise one or more compounds of the subformula IIIb1

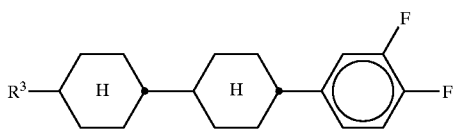

IIIb1 in which $R^3$ is as defined above.

In the compounds of the formula IIIb1, $R^3$ is particularly preferably n-propyl, n-pentyl or n-heptyl.

The individual compounds, for example of the formulae II and III or their subformulae, or alternatively other compounds which can be used in the SLCDs according to the invention, are either known or can be prepared in a manner similar to that for the known compounds.

Preferred liquid-crystal mixtures comprise none or small amounts of one or more compounds of component B, preferably from 2 to 20%. The compounds of group B are distinguished, in particular, by their low rotational viscosity values $\gamma_1$.

Further preferred liquid-crystal mixtures comprise a plurality of compounds of component A, preferably from 2 to 15%, particularly preferably from 2 to 10%.

Component B preferably comprises one or more compounds selected from the group consisting of the compounds of the formulae IV1 to IV9:

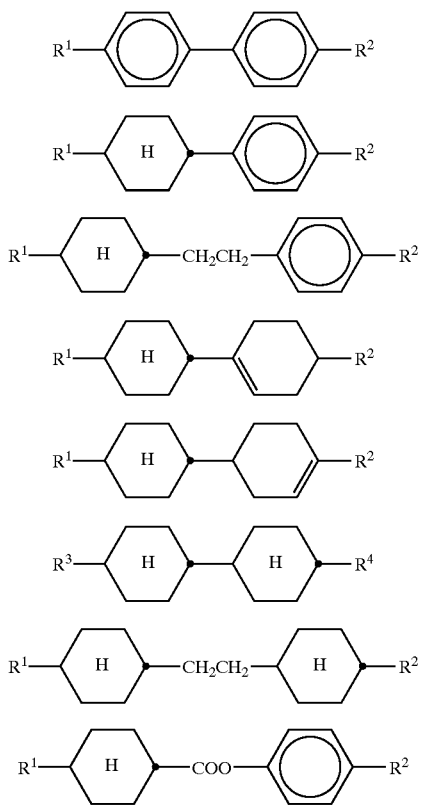

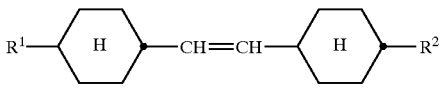

IV9 in which $R^1$ and $R^2$ are as defined for R, and $R^3$ and $R^4$ are each, independently of one another, an alkyl or alkoxy group having 1 to 7 carbon atoms.

Component B may additionally comprise one or more compounds selected from the group consisting of the compounds of the formulae IV10 to IV24:

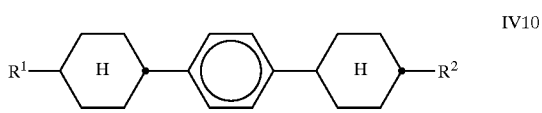

IV10

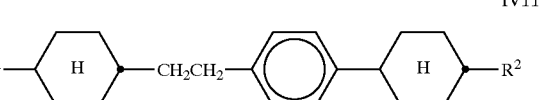

IV11

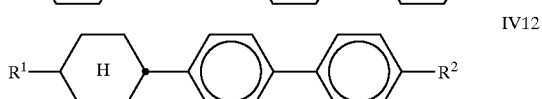

IV12

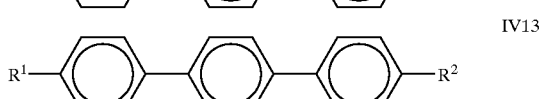

IV13

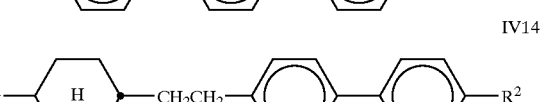

IV14

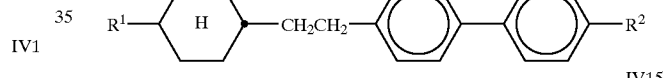

IV15

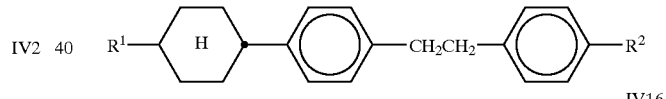

IV16

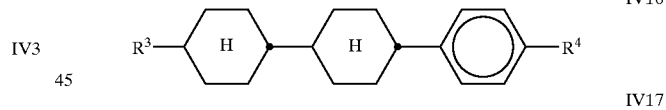

IV17

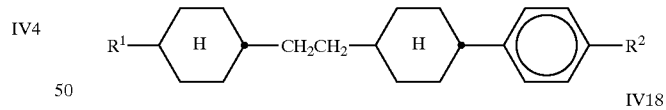

IV18

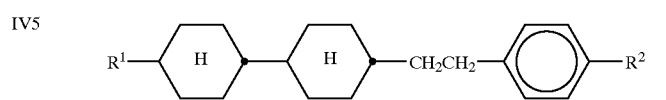

IV19

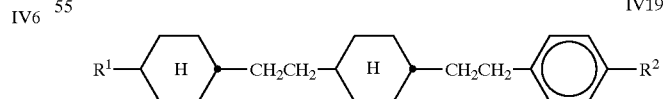

IV20

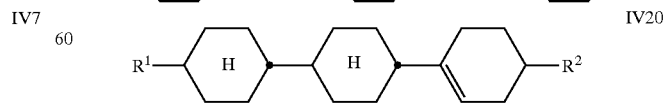

IV21

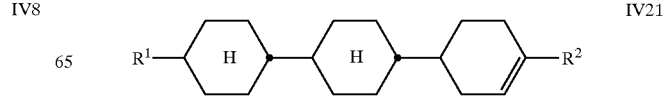

-continued

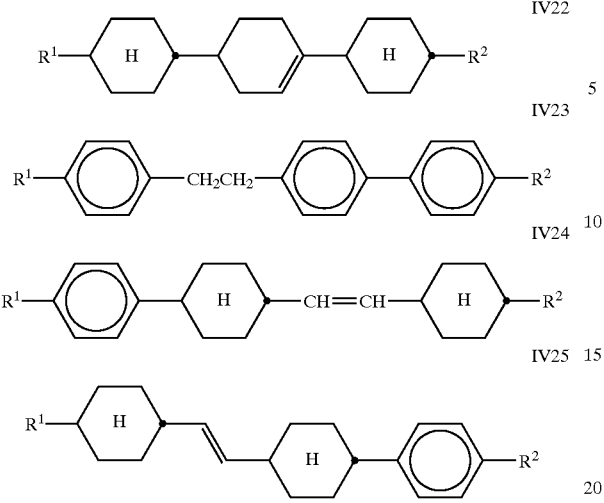

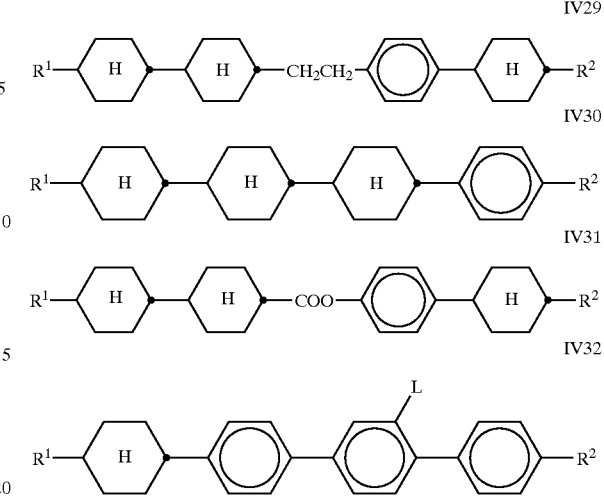

in which $R^1$ and $R^2$ are as defined for R, $R^3$ and $R^4$ are each, independently of one another, an alkyl or alkoxy group having 1 to 7 carbon atoms, and the 1,4-phenylene groups in IV10 to IV19, IV23 and IV24 may each, independently of one another, also be monosubstituted or polysubstituted by fluorine. In the compounds of the formula IV25, $R^1$ is preferably alkenyl, in particular vinyl and 1-trans-propenyl.

Particular preference is given to mixtures comprising one or more compounds of the following formula:

IV12a in which $R^{1\#}$ is alkenyl having 2 to 7 carbon atoms, and $R^{2\#}$ is straight-chain alkyl having 1 to 4 carbon atoms.

In these compounds, $R^{1\#}$ is particularly preferably vinyl, 1E-propenyl, 1-butenyl, 3E-butenyl or 3E-pentenyl. $R^{2\#}$ is particularly preferably methyl, ethyl or propyl, in particular methyl or ethyl.

Component B furthermore preferably comprises one or more compounds selected from the group consisting of the compounds of the formulae IV26 to IV32:

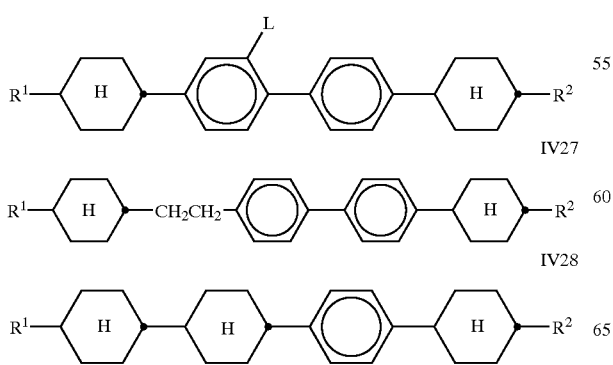

in which $R^1$ and $R^2$ are as defined for R, and L is F or H. The 1,4-phenylene groups in the compounds IV26 to IV32 may also each, independently of one another, be monosubstituted or polysubstituted by fluorine.

Preference is given to mixtures which comprise compounds of the formula IV26 in which L is F.

Particular preference is given to compounds of the formulae IV26 to IV32 in which $R^1$ is alkyl and $R^2$ is alkyl or alkoxy, in particular alkoxy; in each case having 1 to 7 carbon atoms. Preference is furthermore given to compounds of the formulae IV26 and IV32 in which L is F.

In the compounds. of the formulae IV1 to IV15 and IV17 to IV32, $R^1$ and $R^2$ are particularly preferably straight-chain alkyl or alkoxy having 1 to 12 carbon atoms.

Component B may comprise one or more compounds selected from the group consisting of the compounds of the formulae VI and VII:

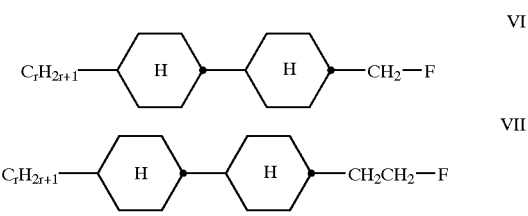

in which $Cr_rH_{2r+1}$ is a straight-chain alkyl group having up to 9 carbon atoms.

In a further preferred embodiment, the liquid-crystal mixtures according to the invention, besides components A, B, C and D, additionally comprise one or more compounds selected from the group consisting of the compounds of the formulae VIII and IX

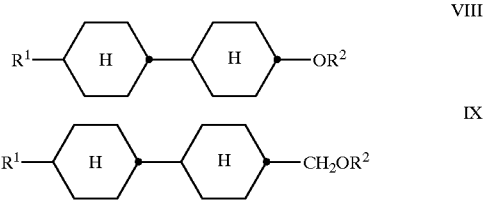

in which $R^1$ and $R^2$ are as defined above.

Preference is furthermore given to liquid-crystal mixtures comprising at least one component selected from the group consisting of the compounds of the formulae X to XIV:

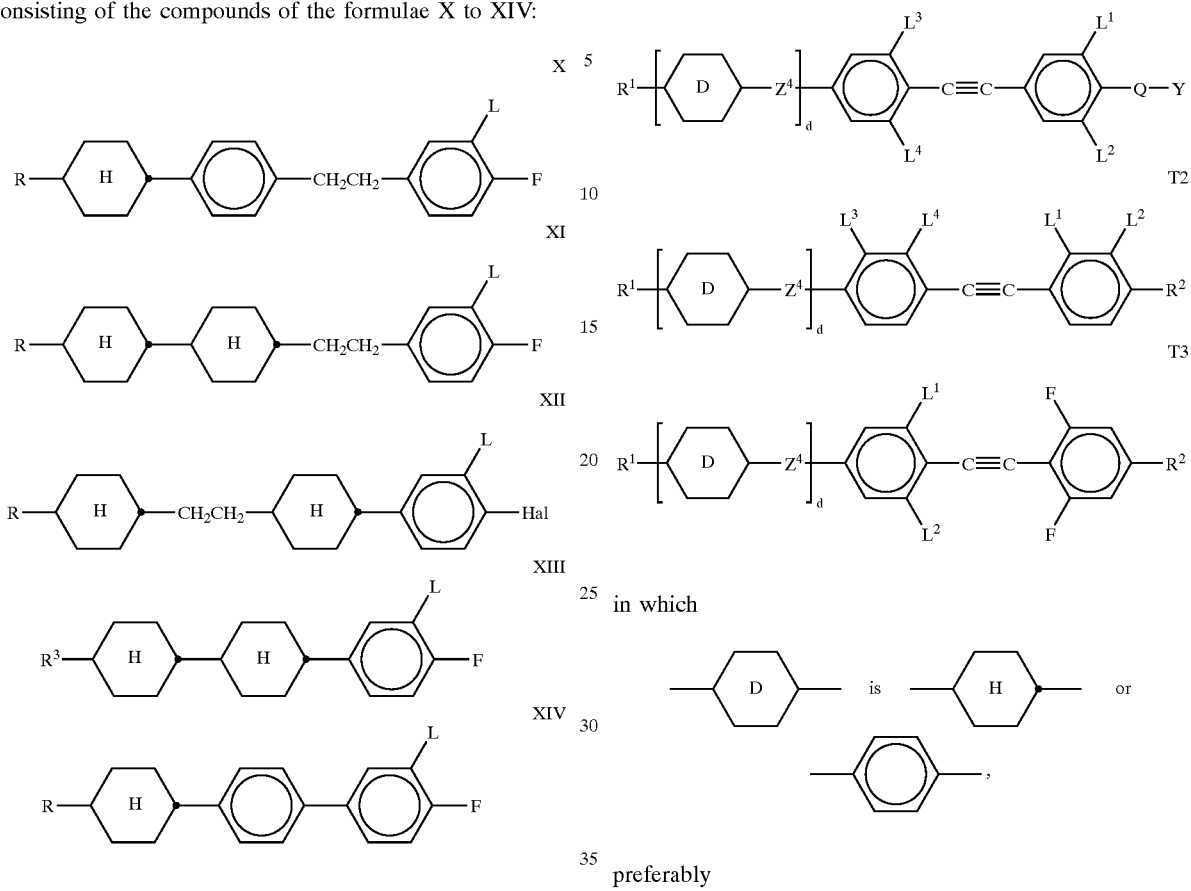

in which Hal is F or Cl, L is H or F, and R and $R^3$ are as defined above, in particular in which R and $R^3$ are each independently alkyl having 1 to 5 carbon atoms.

The liquid-crystalline mixtures optionally comprise an optically active component C in such an amount that the ratio between the layer thickness (separation of the outer plates) and the natural pitch of the chiral nematic liquid-crystal mixture is greater than 0.2. For the component, a multiplicity of chiral dopants, some of which are commercially available, is available to the person skilled in the art, for example such as cholesteryl nonanoate, s-811 from Merck KGaA, Darmstadt, and CB15 (BDH, Poole, UK). The choice of dopants is not crucial per se.

The proportion of the compounds of component C is preferably from 0 to 10%, in particular from 0 to 5%, particularly preferably from 0 to 3%.

In a particularly preferred embodiment, the mixtures according to the invention comprise from about 2 to 45%, in particular from 5 to 25%, of liquid-crystalline tolan compounds. This enables smaller layer thicknesses to be used, significantly shortening the response times. The tolan compounds are preferably selected from Group T consisting of the compounds of the formulae T1, T2 and T3:

in which

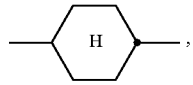

preferably

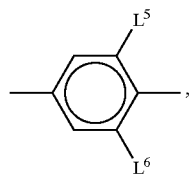

also

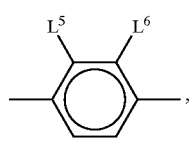

in formula T1 and also

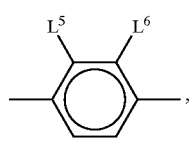

in formula T2, d is 0 or 1, $L^1$ to $L^6$ are each, independently of one another, H or F, Q is —$CF_2$—, —CHF—, —$OCF_2$—, —OCHF— or a single bond, Y is F or Cl,
Z$^4$ is —CO—O—, —CH$_2$CH$_2$— or a single bond, and
R$^1$ and R$^2$ are as defined above.

Preferred compounds of the formula T1 correspond to the subformulae T1a and T1b

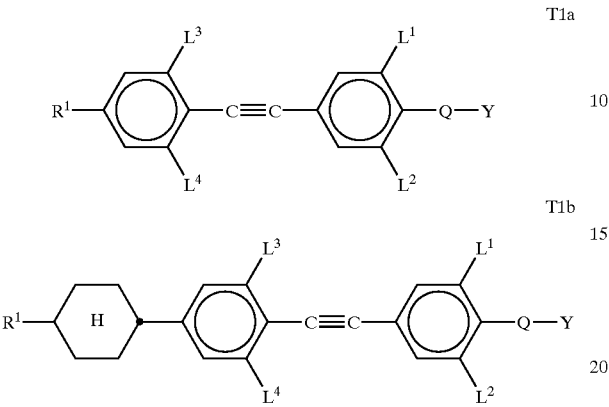

in which L$^1$ to L$^4$ are H or F, and Q—Y is F, Cl or OCF$_3$, in particular F or OCF$_3$.

Preferred compounds of the formula T2 correspond to the subformulae T2a to T2g

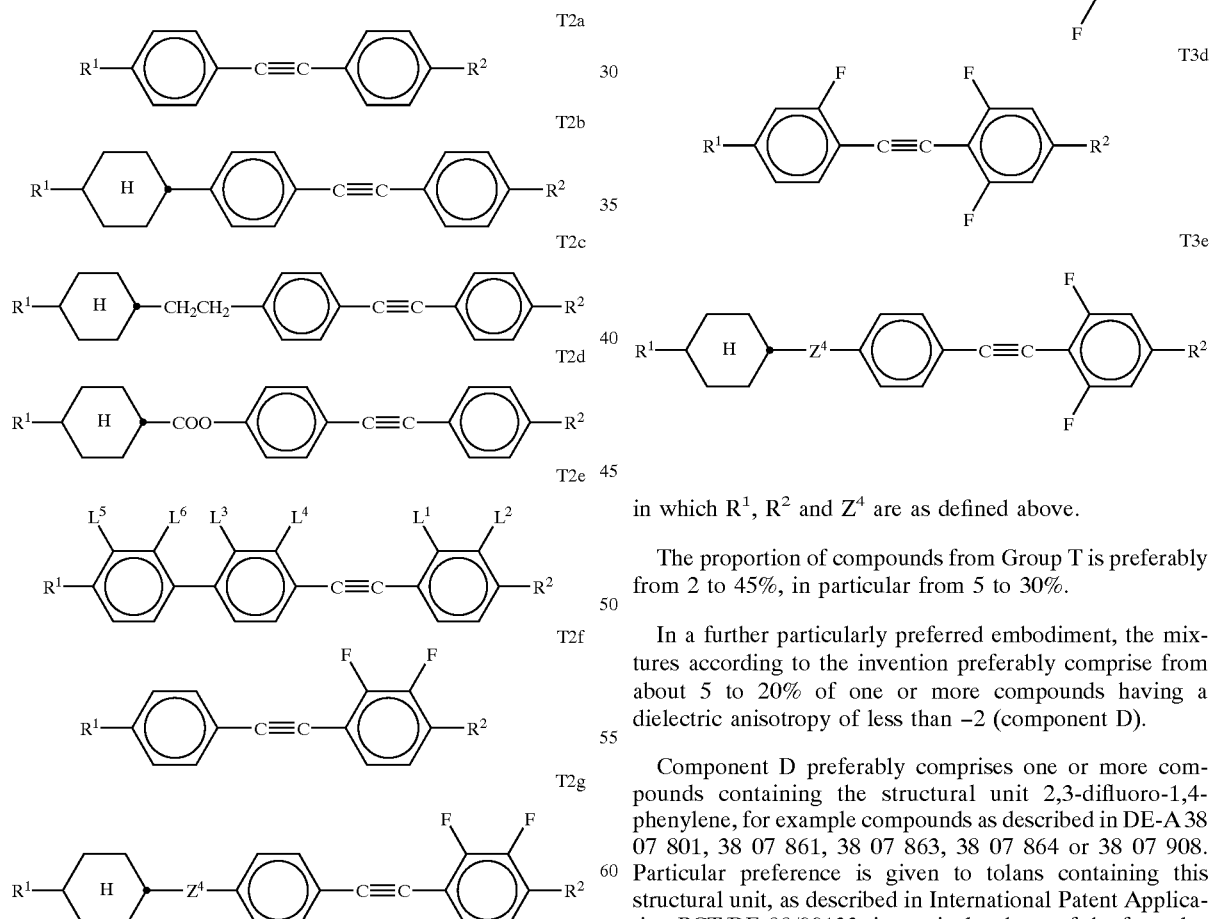

in which R$^1$, R$^2$ and Z$^4$ are as defined above, and L$^1$ to L$^6$ are H or F.

Particularly preferred compounds of the formula T2e are those in which one, two or three. of the radicals L$^1$ to L$^6$ are F and the others are H, where L$^1$ and L$^2$ or L$^3$ and L$^4$ or L$^5$ and L$^6$ are not both simultaneously F.

Preferred compounds of the formula T3 correspond to the subformulae T3a to T3e

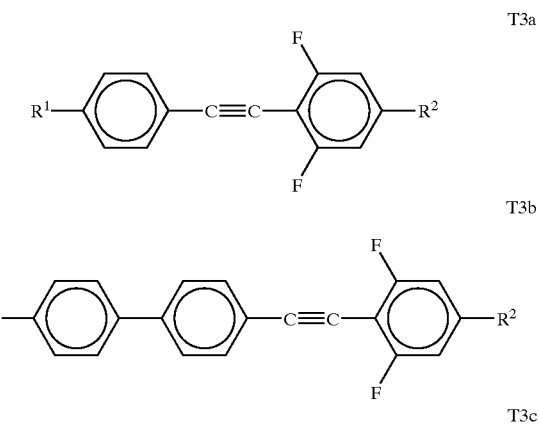

in which R$^1$, R$^2$ and Z$^4$ are as defined above.

The proportion of compounds from Group T is preferably from 2 to 45%, in particular from 5 to 30%.

In a further particularly preferred embodiment, the mixtures according to the invention preferably comprise from about 5 to 20% of one or more compounds having a dielectric anisotropy of less than −2 (component D).

Component D preferably comprises one or more compounds containing the structural unit 2,3-difluoro-1,4-phenylene, for example compounds as described in DE-A 38 07 801, 38 07 861, 38 07 863, 38 07 864 or 38 07 908. Particular preference is given to tolans containing this structural unit, as described in International Patent Application PCT/DE 88/00133, in particular those of the formulae T2f and T2g.

Further known compounds of component D are, for example, derivatives of 2,3-dicyanohydroquinones or cyclohexane derivatives containing the structural unit

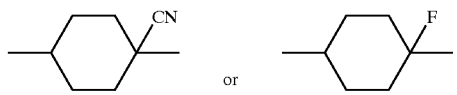

as described in DEA 32 31 707 or DE-A 34 07 013 respectively.

The liquid-crystal mixture according to the invention preferably comprises one or more compounds selected from Group B1 consisting of compounds of the formulae B1I to B1IV:

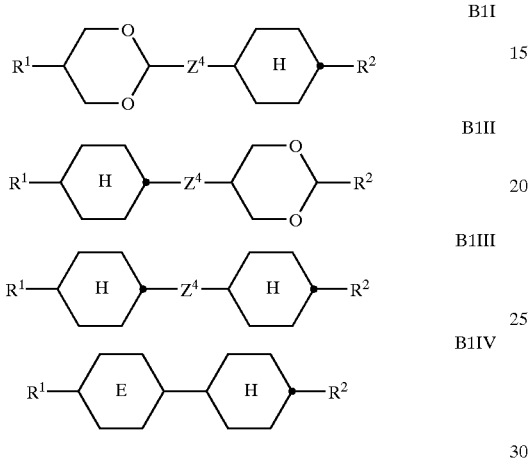

in which
R$^1$, R$^2$ and Z$^4$ are as defined above and is

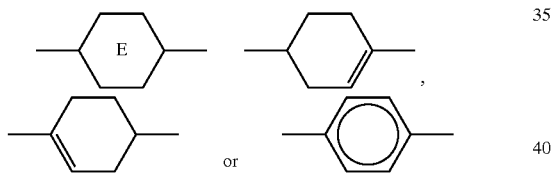

and/or at least one compound selected from Group B2 consisting of compounds of the formulae B2I to B2III:

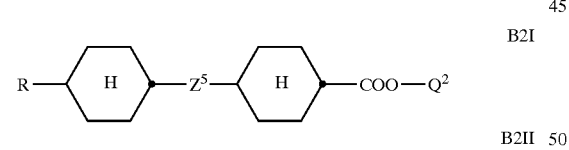

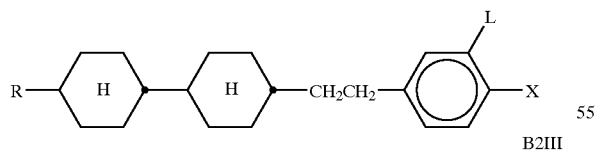

in which
R is as defined above,
Z$^5$ is —CH$_2$CH$_2$—, —CO—O— or a single bond, Q$^2$ is

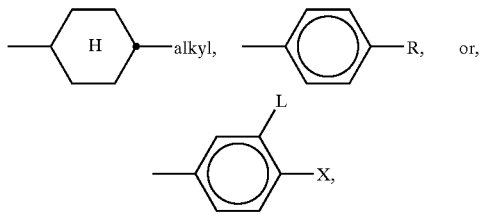

alkyl is an alkyl group having 1 to 9 carbon atoms,
X is CN or F, and
L is H or F,
and/or at least one compound selected from Group B3 consisting of compounds of the formulae B3I to B3III:

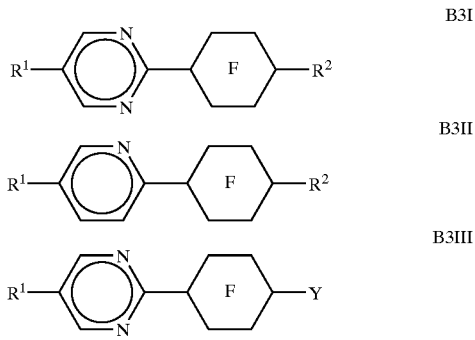

in which
R$^1$ and R$^2$ are each, independently of one another, as defined above,
Y is F or Cl, and

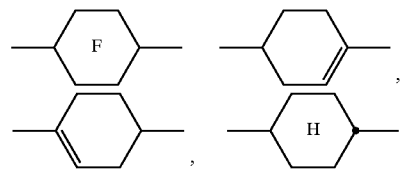

is

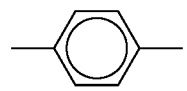

or.

The proportion of the compounds from Group B1 is preferably from 10 to 50%, in particular from 15 to 40%. Compounds of the formulae Bu1III and B1IV are preferred.

Particularly preferred compounds from Group B1 are those of the following subformulae:

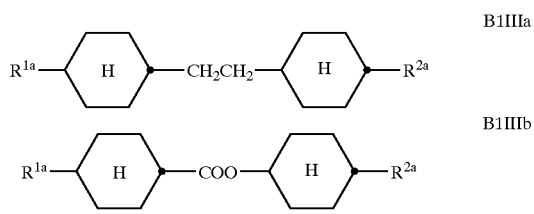

-continued

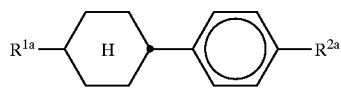
B1IVa in which

R$^{1a}$ is CH$_3$—(CH$_2$)$_p$—, CH$_3$—(CH$_2$)$_p$—O—, CH$_3$—(CH$_2$)$_p$—O—CH$_2$—, trans-H—(CH$_2$)$_q$—CH=CH(CH$_2$CH$_2$)$_s$—CH$_2$O— or trans-H—(CH$_2$)$_q$—CH=CH—(CH$_2$CH$_2$)$_s$—, R$^{2a}$ is CH$_3$—(CH$_2$)p—, p is 1, 2, 3 or 4, q is 0, 1, 2 or 3, and s is 0 or 1.

The proportion of the compounds of the abovementioned subformulae B1IIIa and B1IIIb together with the compounds of the formula IB1 is preferably from about 5 to 45%, particularly preferably from about 10% to 35%.

The proportion of the compounds of the subformula B1IVa or of the compounds of the formula B1IV is preferably from about 5 to 40%, particularly preferably from about 10 to 35%.

In a particularly preferred embodiment, the mixtures simultaneously comprise compounds of the formulae B1III and B1IV together with the compounds of the formulae IB1 and IB2, where the total proportion for components from Group B1 is observed.

If compounds of the formulae B1I and/or B1III are present, R$^1$ and R$^2$ are preferably each, independently of one another, n-alkyl having 1 to 7 carbon atoms or (trans)-n-alkenyl having 3 to 7 carbon atoms. Z is preferably a single bond.

Preference is furthermore given to mixtures according to the invention which comprise one or more compounds of the formula B1IV in which

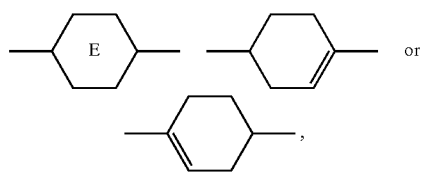

and R$^1$ and R$^2$ have one of the preferred meanings indicated above and are particularly preferably n-alkyl having 1 to 7 carbon atoms.

In all cases, the total proportion of components from Group B1 is observed.

The proportion of the compounds from Group B2 is preferably from about 0 to 45%, in particular from 5 to 20%. The proportion (preferred ranges) for B2I to B2III is as follows:

B2I: from about 5 to 30%, preferably from about 5 to 15%,

Sum of B2II and B2III: from about 5 to 25%, preferably from about 10 to 20%.

Preferred compounds from Group B2 are shown below:

B2Ia

B2Ib

B2Ic

B2IIa

B2IIIa

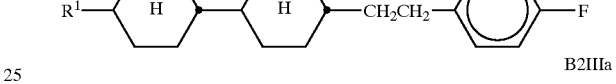

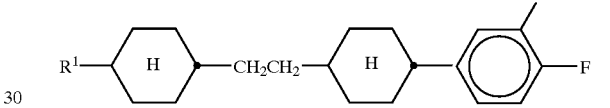

in which R$^1$, R$^2$, L and Z$^5$ are as defined above, although R$^2$ can also be F.

In these compounds, R$^1$ is preferably n-alkyl having 1 to 7 carbon atoms or (trans)-n-alkenyl having 3 to 7 carbon atoms, Z$^5$ is preferably a single bond, R$^2$ preferably has the preferred meaning given above for R or is fluorine, and L is preferably fluorine.

The mixtures according to the invention preferably comprise one or more compounds selected from the group consisting of B2Ic, B2IIa and B2IIIa in a total proportion of from about 5 to 35%.

In a particularly preferred embodiment, the mixtures according to the invention, in addition to B2Ic, B2Ia and B2IIIa (L=F), comprise further terminally fluorinated compounds, selected, for example, from the group consisting of

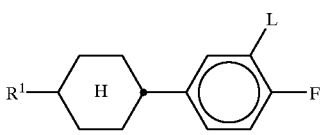
F1

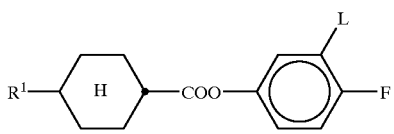
F2 and/or polar heterocyclic compounds selected from the group consisting of

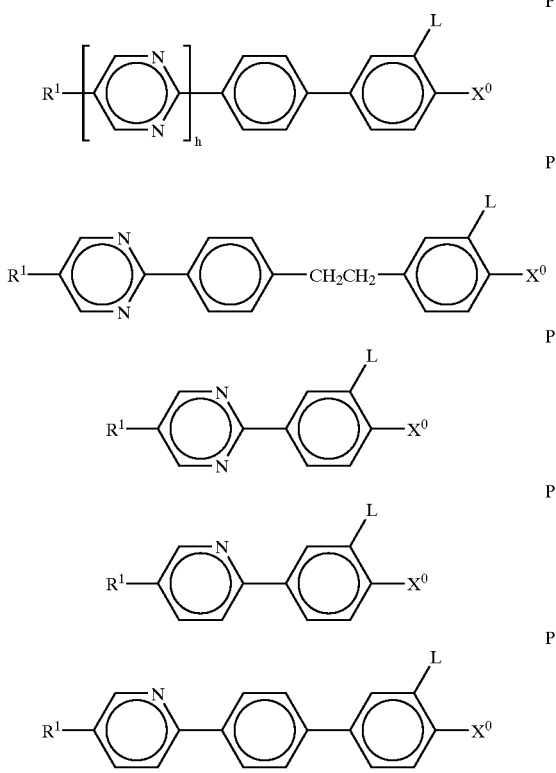

P1

P2

P3

P4

P5 in which $R^1$ is preferably n-alkyl having 1 to 7 carbon atoms or (trans)-n-alkenyl having 3 to 7 carbon atoms, h is 0 or 1, $X^0$ is F, Cl, $CF_3$, $-OCF_3$ or $-OCHF_2$, and L is H or F.

The total proportion of all terminally fluorinated compounds is preferably from about 5 to 80%, in particular from about 15 to 70%.

The proportion of compounds from Group B3 is preferably from about 5 to 30%, particularly preferably from about 10 to 20%. $R^1$ is preferably n-alkyl or n-alkoxy, in each case having 1 to 9 carbon atoms.

However, it is also possible to employ analogous compounds containing alkenyl or alkenyloxy groups. Compounds of the formula B3I are preferred.

The term "alkenyl" in the definition of R, $R^1$, $R^2$, $R^b$, $R^d$, $R^e$, $R^g$ and $R^{1\#}$ comprises straight-chain and branched alkenyl groups having carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The terms "alkyl" and "alkoxy" in the definitions of $R^a$, $R^b$, $R^c$, $R^d$, $R^e$, $R^f$, R, $R^1$, $R^2$, $R^3$ and $R^4$ comprise straight-chain and branched alkyl and alkoxy groups, in particular the straight-chain groups. Particularly preferred alkyl and alkoxy groups are ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, methoxy, octyloxy, nonyloxy, decyloxy, undecyloxy or dodecyloxy.

The mixtures according to the invention comprise compounds of the formulae IA and IB and/or IC and preferably compounds from at least one of groups B1, B2 and B3. They preferably comprise one or more compounds from Group B1 and one or more compounds from Group B2 and/or B3.

In a preferred embodiment, the liquid-crystalline media according to the invention comprise 3, 4, 5 or 6 compounds of the formulae IA and IB; the content of these compounds is generally from 10 to 80% by weight, preferably from 15 to 50% by weight, based on the mixture as a whole.

In a further preferred embodiment, the mixtures comprise one or more compounds of the following formulae

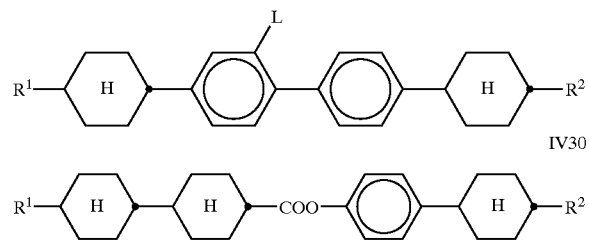

IV25

IV30 in which $R^1$, $R^2$ and L have the preferred meanings given under compounds of component B. The proportion of these compounds in the liquid-crystal mixtures is preferably from 0 to 45%, in particular from 5 to 30%;

one or more, in particular 1, 2, 3 or 4, compounds selected from the compounds of the formulae IIIb, IIId, IIIf, IIIh, IIIi, IIIm, IIIs, IIIt and IIIu;

at least two compounds selected from the compounds of the formulae IIb1, IIb2, IIc1 and IIc2. The proportion of these compounds in the liquid-crystal mixtures is preferably from 0 to 60%, particularly from 10 to 45%;

one or more compounds of the formula T1 or T2, in particular one or more compounds of the formula T2a and/or T2b, where the proportion of these compounds in the liquid-crystal mixtures is preferably from 0 to 25%, in particular from 1 to 15%.

Further particularly preferred embodiments relate to liquid-crystal mixtures comprising at least two compounds of the formula AI or AII;

one or more compounds in which R is a trans-alkenyl group or trans-alkenyloxy group;

one or more compounds selected from the following group:

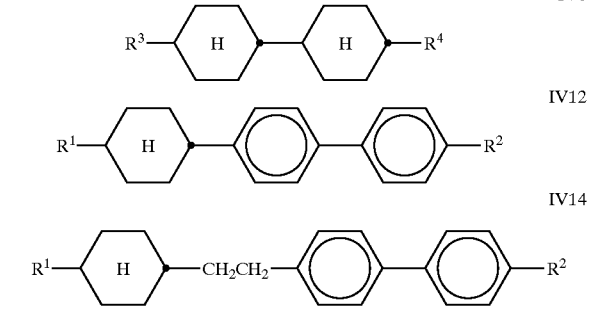

IV6

IV12

IV14 in which $R^1 R^2$ and L have the preferred meanings given under compounds of component B, and $R^3$ and $R^4$ are as defined above. The 1,4-phenylene group in the abovementioned compounds may also be substituted by fluorine;
one or more compounds of the formulae

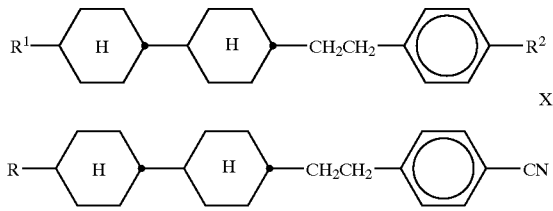

in which R, $R^1$ and $R^2$ are as defined above.

In particular when used in SLCDs having high layer thicknesses, the mixtures according to the invention are distinguished by very low total response times ($t_{tot}=t_{on}+t_{off}$). Low total response times are an important criterion, in particular, for SLCDs for use as displays in laptops in order to be able to display cursor movements without interference.

The liquid-crystal mixtures used in the STN and TN cells according to the invention are dielectrically positive with $\Delta\epsilon \geq 1$. Particular preference is given to liquid-crystal mixtures where $\Delta\epsilon \geq 3$ and very particularly to those where $\Delta\epsilon \geq 5$.

The liquid-crystal mixtures according to the invention have favourable values for the threshold voltage $V_{10/0/20}$ and for the rotational viscosity $\gamma_1$. Preferably, the threshold voltage $V_{10/0/20}$ for the liquid crystal mixtures of the invention is 1–1.4 V, especially 1–1.2 V. Preferably, the rotational;viscosity for the liquid crystal mixtures according to the invention is 190–270 mPa·s, especially 200–250 mPa·s. If the value for the optical path difference d·$\Delta$n is specified, the value for the layer thickness d is determined by the optical anisotropy $\Delta$n. In particular at relatively high values for d·$\Delta$n, the use of liquid-crystal mixtures according to the invention having a relatively high value for the optical anisotropy is generally preferred since the value for d can then be chosen to be relatively small, which results in more favourable values for the response times. However, those liquid-crystal displays according to the invention which contain liquid-crystal mixtures according to the invention having relatively small values for An are also characterized by advantageous values for the response times.

The liquid-crystal mixtures according to the invention are furthermore characterized by advantageous values for the steepness of the electro-optical characteristic line and can. be operated at high multiplex rates, in particular at temperatures above 20° C. In addition, the liquid-crystal mixtures according to the invention have high stability and favourable values for the electrical resistance and the frequency dependence of the threshold voltage. The liquid-crystal displays according to the invention have a broad operating temperature range and good angle dependence of the contrast.

The construction of the liquid-crystal display elements according to the invention from polarizers, electrode base plates and electrodes having a surface treatment such that the preferential alignment (director) of the liquid-crystal molecules in each case adjacent thereto is usually twisted by a value of from 160° to 720° from one electrode to the other corresponds to the structure which is conventional for display elements of this type. The term "conventional structure" is broadly drawn here and also includes all derivatives and modifications of the TN and STN cell, in particular also matrix display elements, and display elements which contain additional magnets.

The surface tilt angle at the two outer plates may be identical or different. Identical tilt angles are preferred. Preferred TN displays have pretilt angles between the longitudinal axis of the molecules at the surface of the outer plates and the outer plates of 0° to 7°, preferably 0.01° to 5°, in particular 0.1 to 2°. In STN displays, the pre-tilt angle is 1° to 30°, preferably 1° to 12°, in particular 3° to 10°.

The twist angle of the TN mixture in the cell has a value of 22.5° to 170°, preferably 45° to 130°, in particular 80° to 115°. The twist angle of the STN mixture in the display from alignment layer to alignment layer has a value of about 100° to 600°, preferably 170° to 300°, in particular 180° to 270°.

The liquid-crystal mixtures which can be used according to the invention are prepared in a manner which is conventional per se. In general, the desired amount of the components used in a lesser amount is dissolved in the components making up the principal constituent, advantageously at elevated temperature. It is also possible to mix solutions of the components in an organic solvent, for example in acetone, chloroform or methanol, and, after mixing, to remove the solvent again, for example by distillation.

The dielectrics may also contain further additives which are known to the person skilled in the art and are described in the literature. For example, 0–15% of pleochroic dyes may be added.

The entire disclosure of all applications, patents and publications, cited above and below, and of corresponding German Application No. 199 60 187.9 filed Dec. 14, 1999, is hereby incorporated by reference.

EXAMPLES

In the present application and in the examples below, the structures of the liquid-crystal compounds are indicated by acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is given. In individual cases, the acronym for the parent structure is followed, separated by a hyphen, by a code for the substituents $R^1$, $R^2$, $L^1$, $L^2$ and $L^3$:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $OC_nH_{2n+1}$ | $C_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |

-continued

| Code for R¹, R², L¹, L², L³ | R¹ | R² | L¹ | L² | L³ |
|---|---|---|---|---|---|
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | H | H | F |
| nmF | $C_nH_{2n+1}$ | $C_mH_{2m+1}$ | F | H | H |
| nCF₃ | $C_nH_{2n+1}$ | CF₃ | H | H | H |
| nOCF₃ | $C_nH_{2n+1}$ | OCF₃ | H | H | H |
| n-Am | $C_nH_{2n+1}$ | —C≡C—$C_mH_{2m+1}$ | H | H | H |
| n-AN | $C_nH_{2n+1}$ | —C≡C—CN | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |
| nV2V-m | $C_nH_{2n+1}$—CH=CH—(CH₂)₂—CH=CH— | —$C_mH_{2m+1}$ | H | H | H |
| nV2V-Om | $C_nH_{2n+1}$—CH=CH—(CH₂)₂—CH=CH— | —$OC_mH_{2m+1}$ | H | H | H |

The TN and STN displays preferably contain liquid-crystalline mixtures composed of one or more compounds from Tables A and B.

TABLE A (L¹, L² and L³ = H or F)

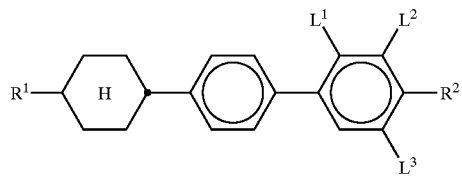

BCH

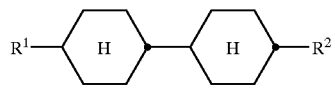

CCH

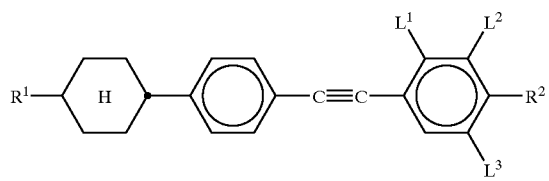

CPTP

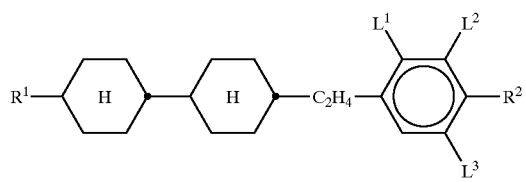

ECCP

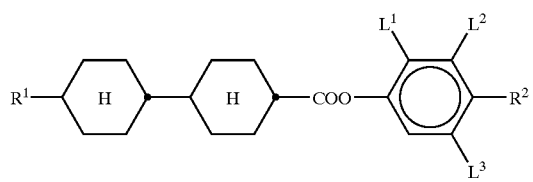

TABLE A-continued
(L¹, L² and L³ = H or F)
CP
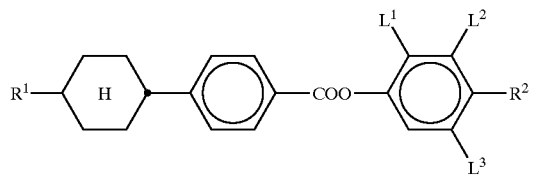
HP
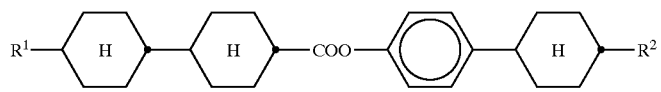
CCPC
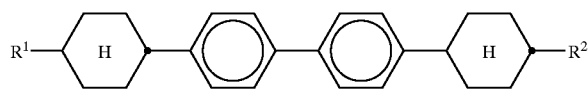
CBC
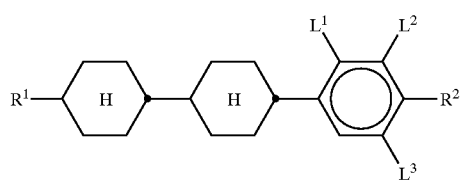
CCP
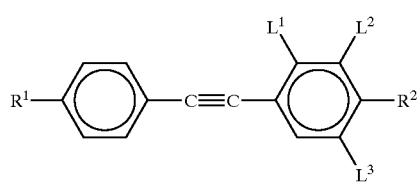
PTP
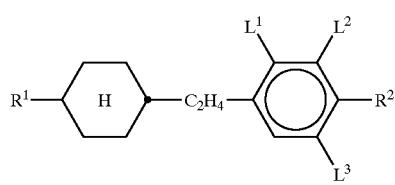
EPCH
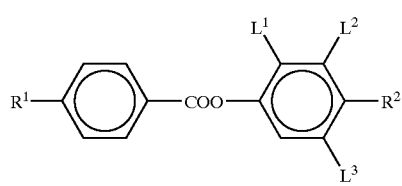
ME TABLE A-continued
($L^1$, $L^2$ and $L^3$ = H or F)
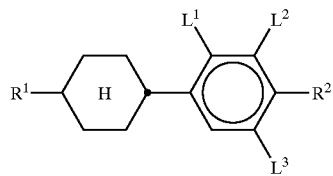
PCH
TABLE B
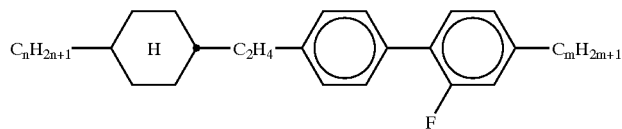
Inm
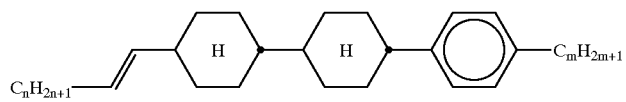
CCP-nV-m
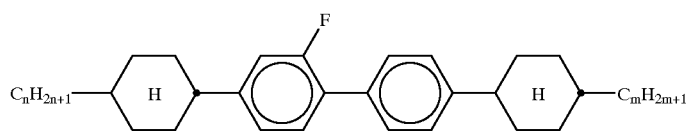
CBC-nmF
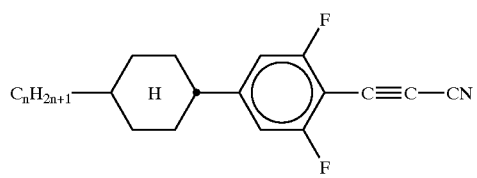
CU-n-AN
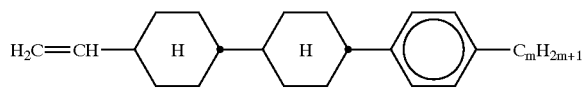
CCP-V-m
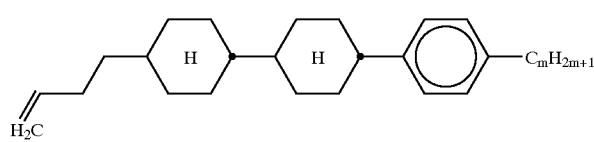
CCP-V2-m
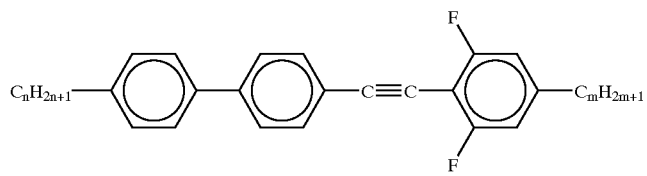

TABLE B-continued
PPTUI-n-m
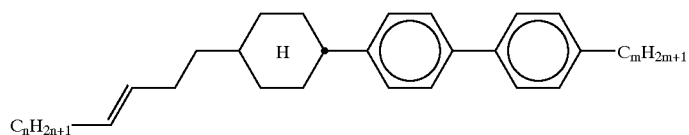
CCP-nV2-m
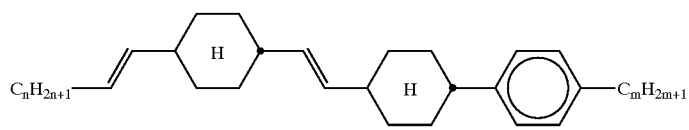
CVCP-nV-m
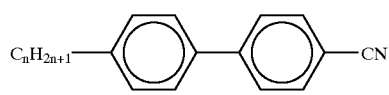
K3n
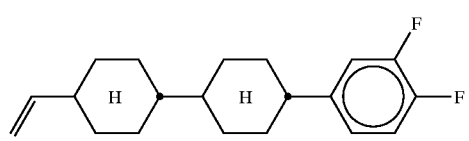
CCG-V-F
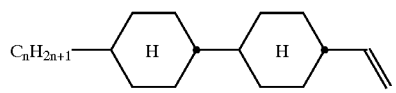
CC-n-V
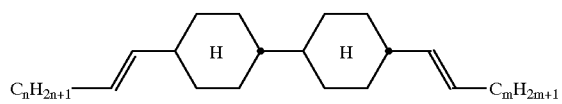
CC-nV-Vm
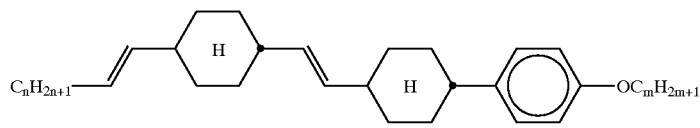
CVCP-nV-Om
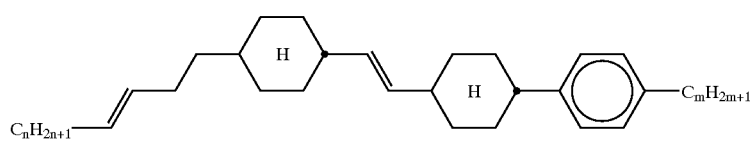
CVCP-nV2-m
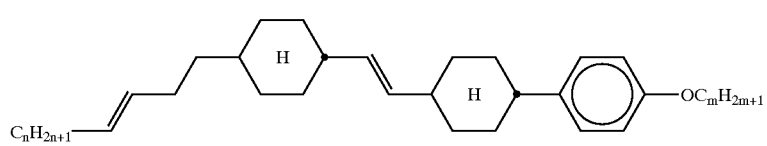
CVCP-nV2-Om TABLE B-continued

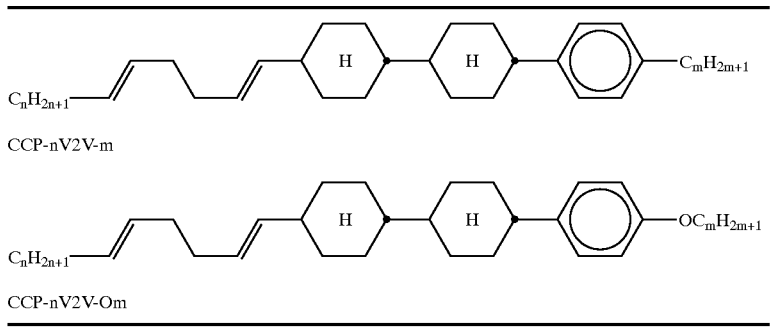

CCP-nV2V-m

CCP-nV2V-Om

The examples below are intended to illustrate the invention without representing a limitation. The following abbreviations are used:
S-N smectic-nematic phase transition temperature
N-I nematic-isotropic phase transition temperature
cl.p. clearing point
visc. rotational viscosity (20° C.)
Δn optical anisotropy (589 nm, 20° C.)
Δε dielectric anisotropy (1 kHz, 20° C.)
$t_{on}$ time from switching on until 90% of the maximum contrast is achieved
$t_{off}$ time from switching off until 10% of the maximum contrast is achieved
$V_{10}$ threshold voltage=characteristic voltage at a relative contrast of 10% (also abbreviated to $V_{(10, 0, 20)}$)
$V_{90}$ characteristic voltage at a relative contrast of 90%
$V_{90}/V_{10}$ steepness
$V_{op}$ operating voltage
$t_{ave}$ $(t_{on}+t_{off})/2$ (average response time)
d layer thickness
p pitch Hereinbefore and hereinafter, all temperatures are given in ° C. Percentages are per cent by weight. The values for the response times and viscosities relate to 20° C., unless stated otherwise. The response time is the average value $t_{ave}$ of the switch-on and switch-off times, unless stated otherwise.

The SLCD is addressed with a rectangular voltage of 80 Hz, unless stated otherwise.

Example 1

An STN mixture consisting of

| | | | |
|---|---|---|---|
| ME2N.F | 8.00% | Clearing point: | 90.3° C. |
| ME3N.F | 8.00% | Δn: | 0.1410 |
| ME4N.F | 12.00% | Twist: | 240° |
| ME5N.F | 9.00% | $V_{10}$: | 1.10 V |
| PCH-3N.F.F | 10.00% | $V_{90}/V_{10}$ : | 1.070 |
| CC-3-V1 | 8.00% | visc. | 242 mPa.s |
| CCG—V—F | 15.00% | | |
| CCP—V2V-1 | 5.00% | | |
| CCP—V2V—O1 | 5.00% | | |
| CCPC-33 | 4.00% | | |
| CCPC-34 | 4.00% | | |
| CCPC-35 | 3.00% | | |
| CBC-33F | 3.00% | | |
| PPTUI-3-2 | 6.00% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A supertwist liquid-crystal display comprising
   two outer plates which, together with a frame, form a cell,
   a nematic liquid-crystal mixture of positive dielectric anisotropy present in said cell,
   electrode layers with alignment layers on the insides of said outer plates,
   a pretilt angle between the longitudinal axis of the molecules at the surface of said outer plates and said outer plates of 0 to 30 degrees, and
   a twist angle of the liquid-crystal mixture in the cell from alignment layer to alignment layer with a value of 22.5° to 600°, and
   said nematic liquid-crystal mixture comprises
   a) 0–60% by weight of a liquid-crystalline component A comprising one or more compounds having a dielectric anisotropy of greater than +1.5;
   b) 0–60% by weight of a liquid-crystalline component B comprising one or more compounds having a dielectric anisotropy of between −1.5 and +1.5;
   c) 0–20% by weight of a liquid-crystalline component D comprising one or more compounds having a dielectric anisotropy of below −1.5; and
   d) optionally an optically active component C in an amount whereby the ratio between the layer thickness and the natural pitch of the resultant chiral nematic liquid-crystal mixture is 0.2 to 1.3,
   wherein said liquid-crystal mixture contains at least one compound of formula IA

IA

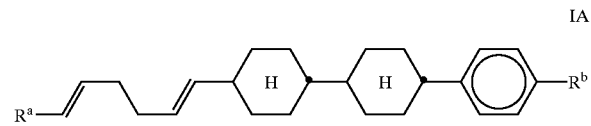

in which
   $R^a$ is H or an alkyl group having 1 to 7 carbon atoms, and
   $R^b$ is an alkyl or alkoxy group having 1 to 10 carbon atoms or an alkenyl or alkenyloxy group having 2 to 10 carbon atoms;
   and at least one compound of formula IB, or at least one compound of formula IC, or at least one compound of formula IB and at least one compound of formula IC

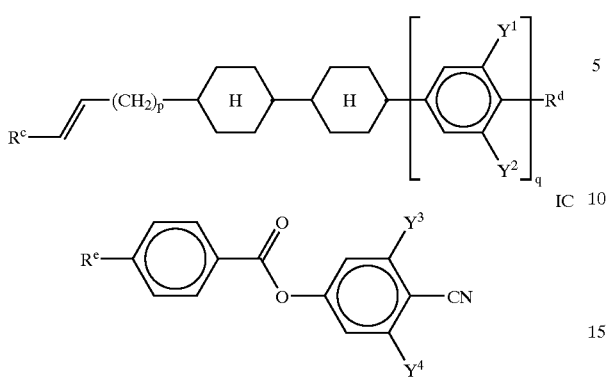

wherein
$R^c$ is H or an alkyl group having 1 to 7 carbon atoms,
$R^d$ is F, $OCF_3$, $OCHF_2$, an alkyl or alkoxy group having 1 to 7 carbon atoms or an alkenyl group having 2 to 7 carbon atoms,
$R^e$ is an alkyl or alkoxy group having 1 to 10 carbon atoms or an alkenyl or alkenyloxy group having 2 to 10 carbon atoms,
$Y^1$ to $Y^4$ are each, independently of one another, H or F,
q is 0 or 1, and
p is 0, 1 or 2; and
wherein component A comprises one or more of the following compounds

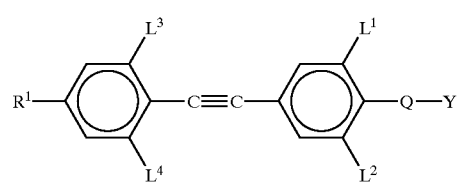

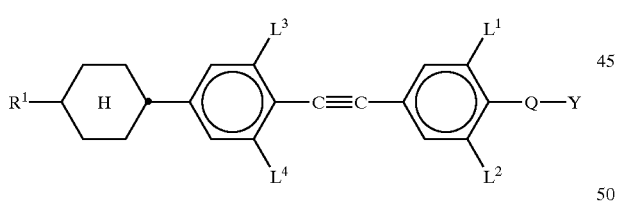

in which $L^1$ to $L^4$ are H or F and Q—Y is F, Cl or $OCF_3$.

2. A liquid-crystal display according to claim 1, wherein said liquid-crystal mixtures comprises at least one compound of the formula IA in which $R^b$ is a straight-chain alkyl or alkoxy group having 1 to 7 carbon atoms.

3. A liquid-crystal display according to claim 1, wherein the liquid-crystal mixtures comprises at least one compound of the following formulas:

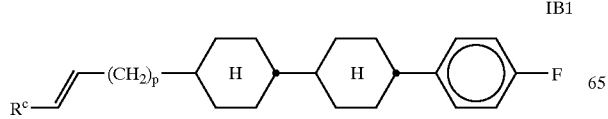

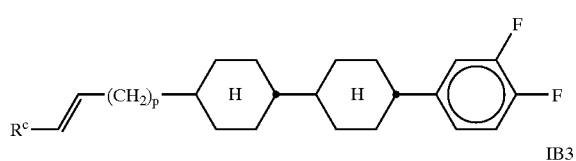

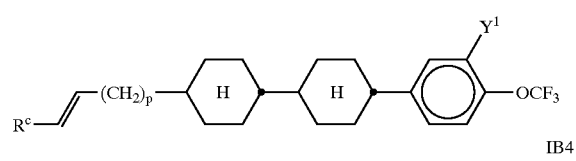

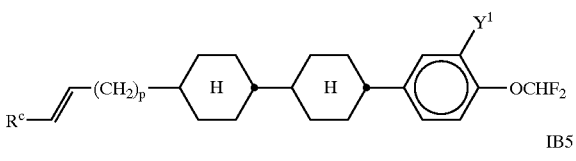

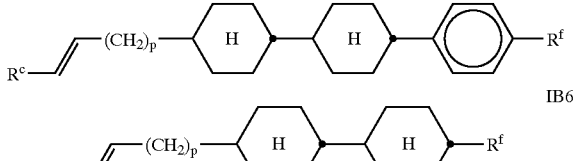

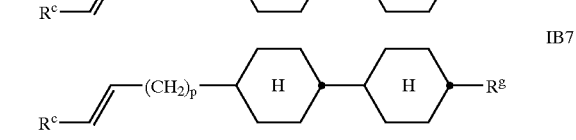

wherein $R^f$ is an alkyl or alkoxy group having 1 to 7 carbon atoms and $R^g$ is an alkenyl group having 2 to 7 carbon atoms.

4. A liquid-crystal display according to claim 1, wherein component A comprises one or more compounds of formulae II and III.

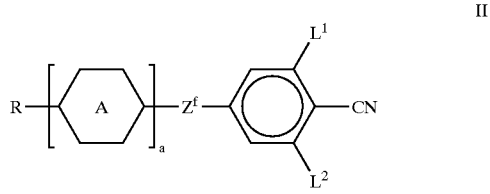

in which

R is a alkyl, alkoxy or alkenyl group having 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another,

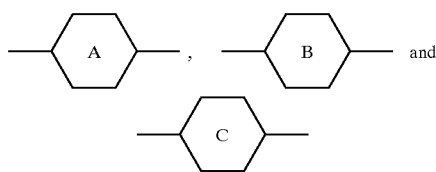

are each, independently of

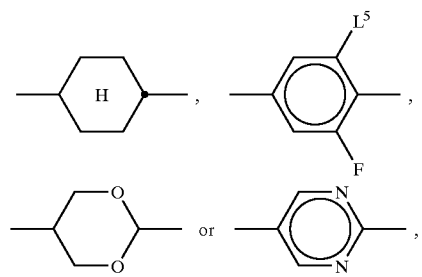

one another, $L^1$ to $L^5$ are each, independently of one another, H or F, $Z^1$ is —COO—, —CH$_2$CH$_2$—, or a single bond, $Z^2$ is —CH$_2$CH$_2$—, —COO—, —C≡C— or a single bond, Q is —CF$_2$—, —CHF—, —OCF$_2$—, —OCHF— or a single bond, Y is F or Cl, a is 1 or 2, and b is 0 or 1, with the proviso that compounds of the formula IB are excluded from the scope of formula III.

5. A liquid-crystal display according to claim 1, wherein comonent A comprises at least one compound of the following formulae

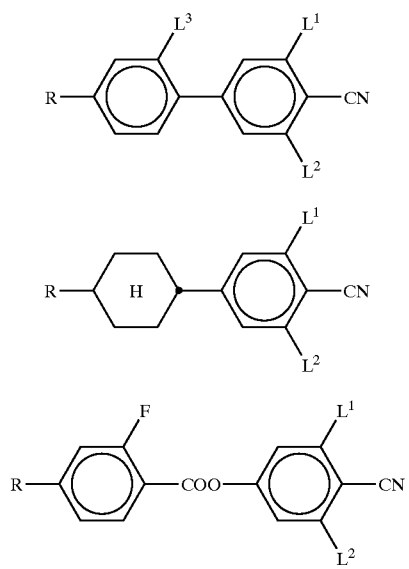

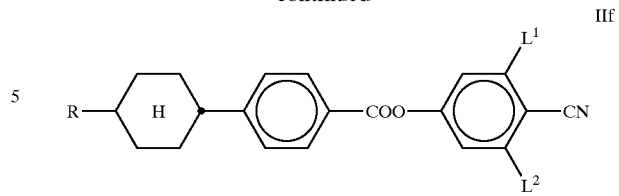

6. A liquid-crystal display according to claim 1, wherein component A comprises one or more compounds of the following formula

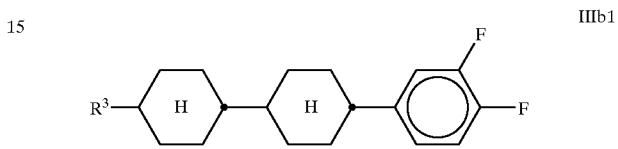

in which $R^3$ is alkyl or alkoxy having 1 to 7 carbon atoms.

7. A liquid-crystal display according to claim 1, wherein in formula T1a and T1b Q—Y is F or OCF$_3$.

8. A liquid-crystal display according to claim 1, wherein component B comprises one or more compounds selected from formulae T2a–T2g

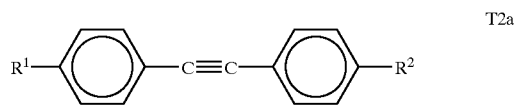

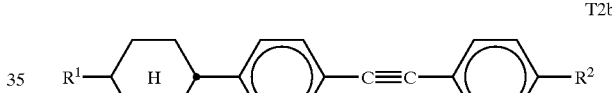

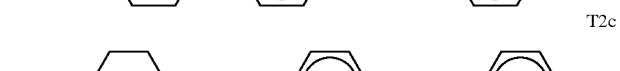

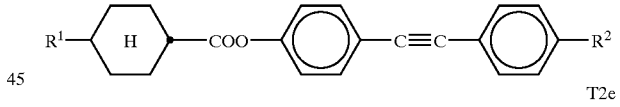

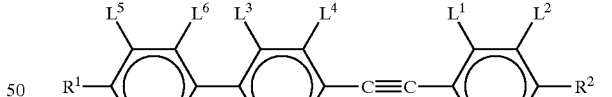

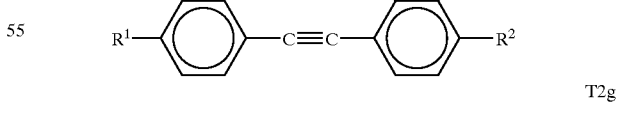

in which $R^1$ and $R^2$ are each, independently, alkyl, alkoxy or alkenyl group having 1 to 12 carbon atoms, in which, in addition, one or two non-adjacent CH$_2$ groups may be replaced by —O—, —CH=CH—, —CO—, —OCO— or —COO— in such a way that O atoms are not linked directly to one another, Z$^4$ is —CO—O—, —CH$_2$CH$_2$— or a single bond, and one, two or three of the radicals L$^1$ and L$^6$ are F and the others H with the proviso that L$^1$ and L$^2$ or L$^3$ and L$^4$ or L$^5$ and L$^6$ are not both simultaneously F.

9. A liquid-crystal display according to claim 1, wherein component B comprises one or more compounds selected formulae T3a to T3e

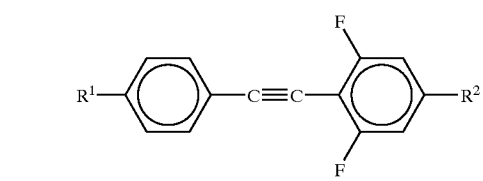

T3a

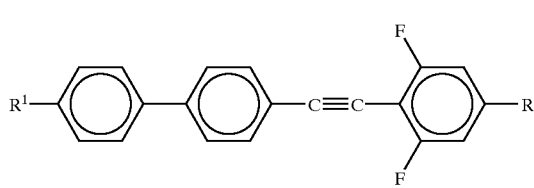

T3b

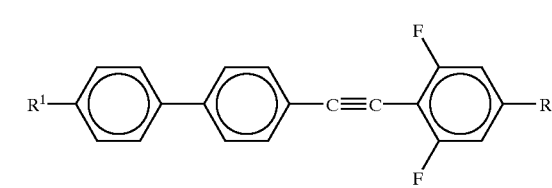

T3c

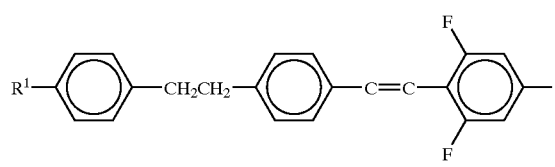

T3d

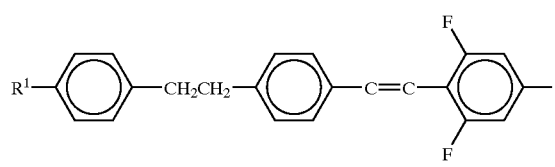

T3e

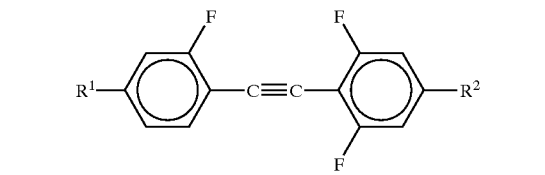

in which

R$^1$ and R$^2$ an alkyl, alkoxy or alkenyl group having 1 to 12 carbon atoms, in which, in addition, one or two non-adjacent CH$_2$ groups may be replaced by —O—, —CH=CH—, —CO—, —OCO— or —COO— in such way that O atoms are not linked directly to one another and Z$^4$ is —CO—O—, —CH$_2$CH$_2$— or a single bond.

10. A liquid-crystal display according to claim 1, wherein component B comprises one or more compounds of the formulae IV26 to IV32

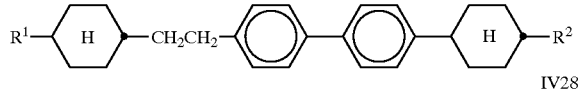

IV26

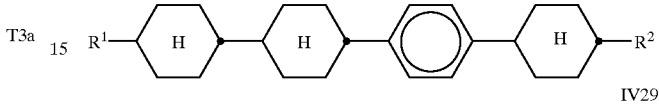

IV27

IV28

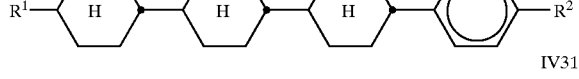

IV29

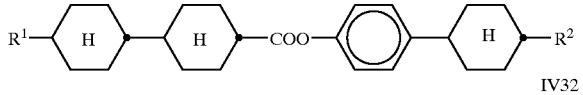

IV30

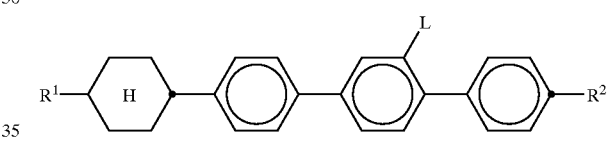

IV31

IV32 in which

R$^1$ and R$^2$ are each, independently, alkyl, alkoxy or alkenyl group having 1 to 12 carbon atoms, in which, in addition, one or two non-adjacent CH$_2$ groups may be replaced by —O—, —CH=CH—, —CO— —OCO— or —COO— in such a way that O atoms are not linked directly to one another and L is H or F.

11. A liquid-crystal display according to claim 1 wherein component B comprises one or more compounds of the formulae IV1 to IV25

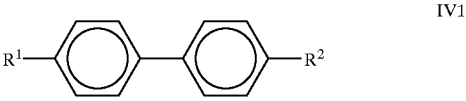

IV1

IV2

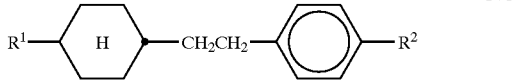

IV3

IV4

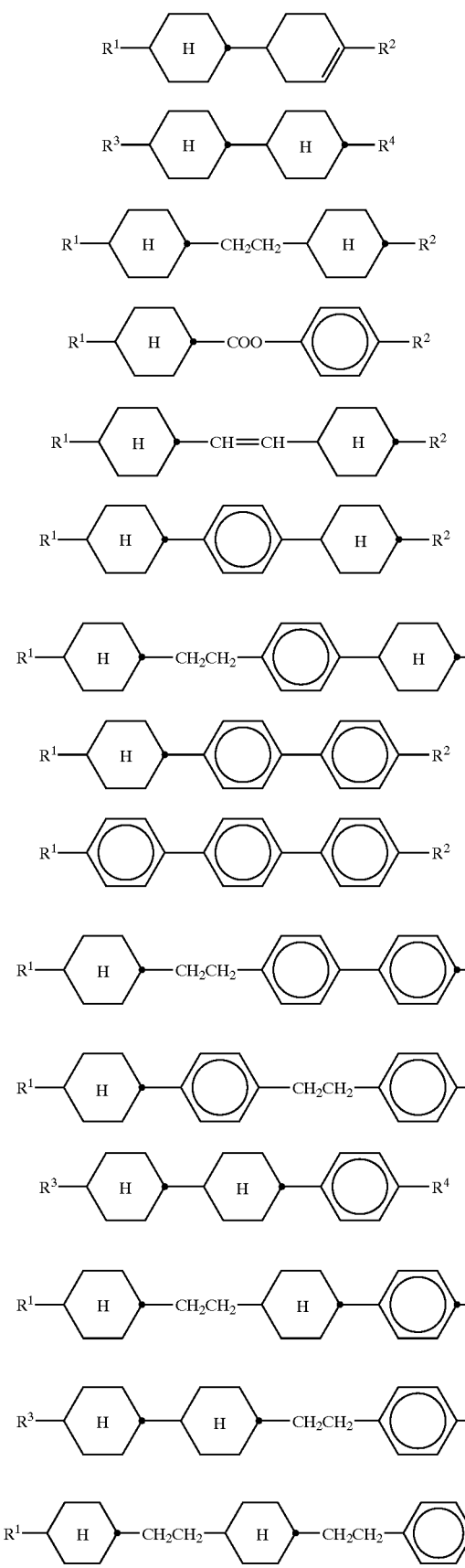

in which

R¹ and R² are each, independently of one another, alkyl, alkoxy or alkenyl group having 1 to 12 carbon atoms, in which, in addition, one or two non-adjacent $CH_2$ groups may be replaced by —O— —CH=CH—, —CO—, —OCO— or —COO— in such a way that O atoms are not linked directly to one another, and R³ and R⁴ are each, independently, alkyl or alkoxy group having 1 to 7 carbon atoms.

12. A liquid-crystal mixture comprising:
a) 0–60% by weight of a liquid-crystalline component A comprising one or more compounds having a dielectric anisotropy of greater than +1.5;
b) 0–60% by weight of a liquid-crystalline component B comprising one or more compounds having a dielectric anisotropy of between −1.5 and +1.5;
c) 0–20% by weight of a liquid-crystalline component D comprising one or more compounds having a dielectric anisotropy of below −1.5;
and
d) optionally an optically active component C in an amount whereby the ratio between the layer thickness (separation of the outer plates) and the natural pitch of the resultant chiral nematic liquid-crystal mixture is 0.2 to 1.3, wherein liquid-crystal mixture additionally comprises at least one compound of formula IA in which $R^a$ is H or an alkyl group having 1 to 7 carbon atoms, and
$R^b$ is an alkyl or alkoxy group having 1 to 10 carbon atoms or an alkenyl or alkenyloxy group having 2 to 10 carbon atoms;

and at least one compound of formula IB, or at least one compound of formula IC or at least one compound of formula IB and at least one compound of IC

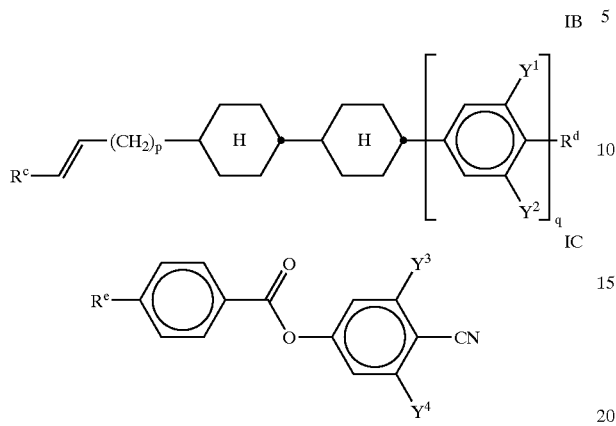

wherein
$R^c$ is H or an alkyl group having 1 to 7 carbon atoms,
$R^d$ is F, $OCF_3$, $OCHF_2$, an alkyl or alkoxy group having 1 to 7 carbon atoms or an alkenyl group having 2 to 7 carbon atoms,
$R^e$ is an alkyl or alkoxy group having 1 to 10 carbon atoms or an alkenyl or alkenyloxy group having 2 to 10 carbon atoms,
$Y^1$ to $Y^4$ are each, independently of one another, H or F,
q is 0 or 1, and
p is 0, 1 or 2.

13. A supertwist liquid-crystal display comprising
two outer plates which, together with a frame, form a cell,
a nematic liquid-crystal mixture of positive dielectric anisotropy present in said cell,
electrode layers with alignment layers on the insides of said outer plates,
a pretilt angle between the longitudinal axis of the molecules at the surface of said outer plates and said outer plates of 0 to 30 degrees, and
a twist angle of the liquid-crystal mixture in the cell from alignment layer to alignment layer with a value of 22.5° to 600°, and
said nematic liquid-crystal mixture comprises
  a) ~60% by weight of a liquid-crystalline component A comprising one or more compounds having a dielectric anisotropy of greater than +1.5;
  b) 0–60% by weight of a liquid-crystalline component B comprising one or more compounds having a dielectric anisotropy of between −1.5 and +1.5;
  c) 0–20% by weight of a liquid-crystalline component D comprising one or more compounds having a dielectric anisotropy of below −1.5; and
  d) optionally an optically active component C in an amount whereby the ratio between the layer thickness and the natural pitch of the resultant chiral nematic liquid-crystal mixture is 0.2 to 1.3,
wherein said liquid-crystal mixture contains at least one compound of formula IA

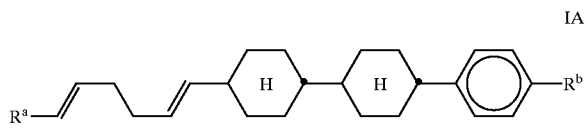

in which
$R^a$ is H or an alkyl group having 1 to 7 carbon atoms, and
$R^b$ is an alkyl or alkoxy group having 1 to 10 carbon atoms or an alkenyl or alkenyloxy group having 2 to 10 carbon atoms;
and at least one compound of formula IB, or at least one compound of formula IC, or at least one compound of formula IB and at least one compound of formula IC

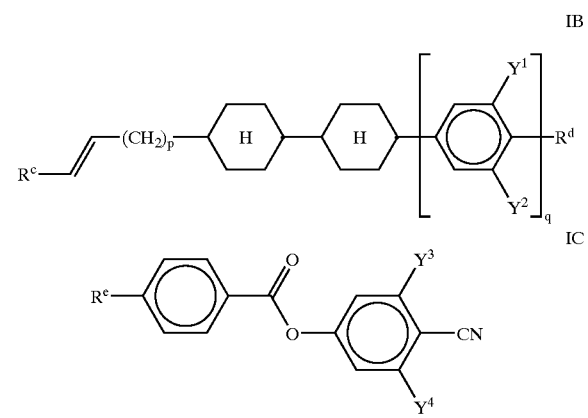

wherein
$R^c$ is H or an alkyl group having 1 to 7 carbon atoms,
$R^d$ is F, $OCF_3$, $OCHF_2$, an alkyl or alkoxy group having 1 to 7 carbon atoms or an alkenyl group having 2 to 7 carbon atoms,
$R^e$ is an alkyl or alkoxy group having 1 to 10 carbon atoms or an alkenyl or alkenyloxy group having 2 to 10 carbon atoms,
$Y^1$ to $Y^4$ are each, independently of one another, H or F,
q is 0 or 1, and
p is 0, 1 or 2; and
wherein component B comprises one or more compounds selected from formulae T2a–T2g

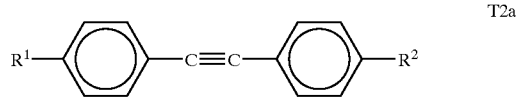

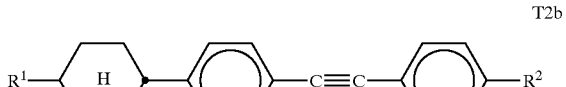

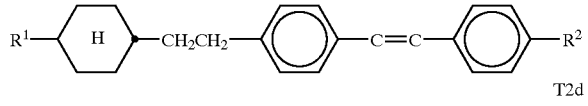

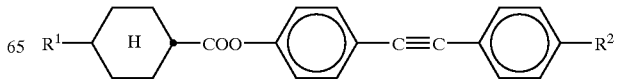

-continued

T2e
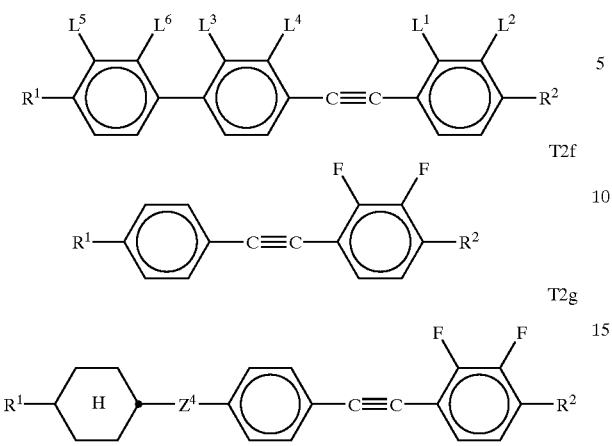

T2f

T2g in which
R$^1$ and R$^2$ are each, independently, alkyl, alkoxy or alkenyl group having 1 to 12 carbon atoms, in which, in addition, one or two non-adjacent CH$_2$ groups may be replaced by —O—, —CH=CH—, —CO—, —OCO— or —COO— in such a way that O atoms are not linked directly to one another,
Z$^4$ is —CO—O—, —CH$_2$CH$_2$— or a single bond, and one, two or three of the radicals L$^1$ to L$^6$ are F and the others are H with the proviso that L$^1$ and L$^2$ or L$^3$ and L$^4$ or L$^5$ and L$^6$ are not both simultaneously F.

14. A supertwist liquid-crystal display comprising two outer plates which, together with a frame, form a cell, a nematic liquid-crystal mixture of positive dielectric anisotropy present in said cell, electrode layers with alignment layers on the insides of said outer plates, a pretilt angle between the longitudinal axis of the molecules at the surface of said outer plates and said outer plates of 0 to 30 degrees, and a twist angle of the liquid-crystal mixture in the cell from alignment layer to alignment layer with a value of 22.5° to 600°, and said nematic liquid-crystal mixture comprises
a) 0–60% by weight of a liquid-crystalline component A comprising one or more compounds having a dielectric anisotropy of greater than +1.5;
b) 0–60% by weight of a liquid-crystalline component B comprising one or more compounds having a dielectric anisotropy of between −1.5 and +1.5;
c) 0–20% by weight of a liquid-crystalline component D comprising one or more compounds having a dielectric anisotropy of below −1.5; and
d) optionally an optically active component C in an amount whereby the ratio between the layer thickness and the natural pitch of the resultant chiral nematic liquid-crystal mixture is 0.2 to 1.3, wherein said liquid-crystal mixture contains at least one compound of formula IA IA
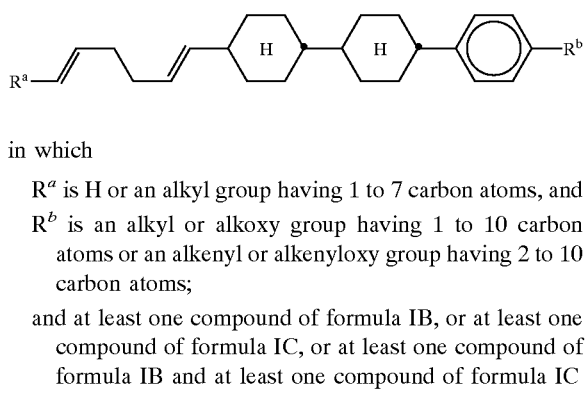

in which
R$^a$ is H or an alkyl group having 1 to 7 carbon atoms, and
R$^b$ is an alkyl or alkoxy group having 1 to 10 carbon atoms or an alkenyl or alkenyloxy group having 2 to 10 carbon atoms;

and at least one compound of formula IB, or at least one compound of formula IC, or at least one compound of formula IB and at least one compound of formula IC

IB

IC
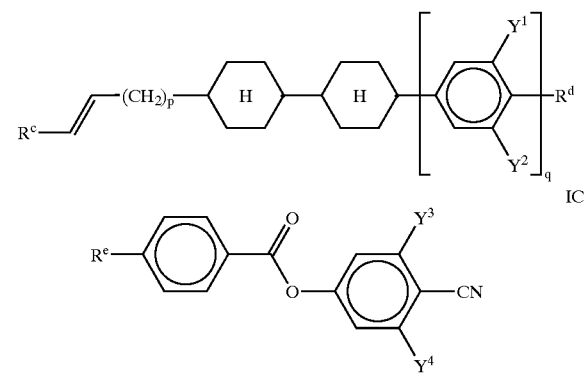

wherein
R$^c$ is H or an alkyl group having 1 to 7 carbon atoms,
R is F, OCF$_3$, OCHF$_2$, an alkyl or alkoxy group having 1 to 7 carbon atoms or an alkenyl group having 2 to 7 carbon atoms,
R$^e$ is an alkyl or alkoxy group having 1 to 10 carbon atoms or an alkenyl or alkenyloxy group having 2 to 10 carbon atoms,
Y$^1$ to Y$^4$ are each, independently of one another, H or F,
q is 0 or 1, and
p is 0, 1 or 2; and wherein component B comprises one or more compounds selected formulae T3a to T3e T3a
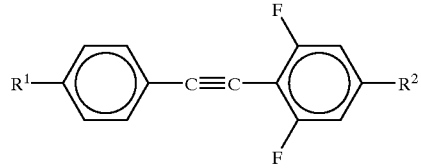

T3b
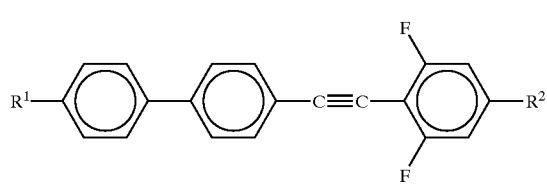

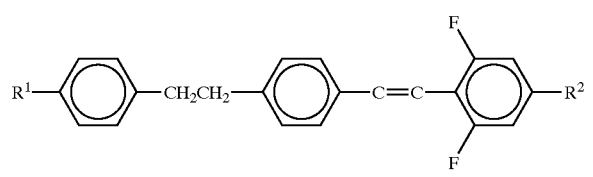
T3c
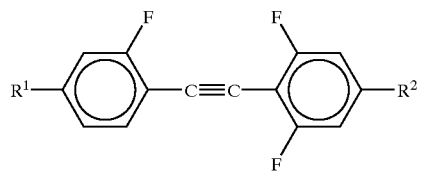
T3d
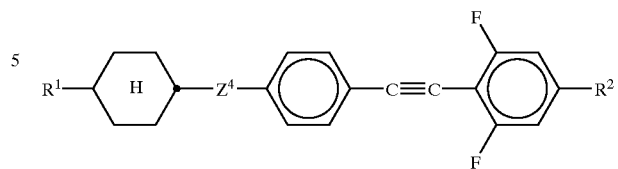
T3e
in which
R¹ and R² are each, independently, an alkyl, alkoxy or alkenyl group having 1 to 12 carbon atoms, in which, in addition, one or two non-adjacent CH$_2$ groups may be replaced by —O—, —CH=CH—, —CO—, —OCO— or —COO— in such a way that O atoms are not linked directly to one another and Z⁴ is —CO—O—, —CH$_2$CH$_2$— or a single bond.
* * * * *

UNITED STATES PATENT AND TRADEMARK OFFICE
CERTIFICATE OF CORRECTION

PATENT NO. : 6,649,229 B2  
DATED : November 18, 2003  
INVENTOR(S) : Harald Hirschmann It is certified that error appears in the above-identified patent and that said Letters Patent is hereby corrected as shown below:

Column 50,  
Line 38, reads "R" should read -- $R^d$ --

Signed and Sealed this

Fourteenth Day of September, 2004

JON W. DUDAS  
*Director of the United States Patent and Trademark Office*